United States Patent
Madani et al.

(10) Patent No.: US 10,594,760 B2
(45) Date of Patent: Mar. 17, 2020

(54) INTELLIGENT EVENT STREAMING

(71) Applicant: Futurewei Technologies, Inc., Plano, TX (US)

(72) Inventors: Habib Madani, Richardson, TX (US); Sanqi Li, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 466 days.

(21) Appl. No.: 15/452,257

(22) Filed: Mar. 7, 2017

(65) Prior Publication Data

US 2018/0213018 A1    Jul. 26, 2018

Related U.S. Application Data

(60) Provisional application No. 62/450,561, filed on Jan. 25, 2017.

(51) Int. Cl.
  *H04L 29/06* (2006.01)
  *H04L 29/08* (2006.01)

(52) U.S. Cl.
  CPC .......... *H04L 65/80* (2013.01); *H04L 65/1073* (2013.01); *H04L 65/605* (2013.01); *H04L 67/2804* (2013.01)

(58) Field of Classification Search
  CPC ... H04L 65/80; H04L 65/1073; H04L 65/605; H04L 67/2804
  USPC ........................................................ 709/219
  See application file for complete search history.

(56) References Cited

U.S. PATENT DOCUMENTS

| | | | |
|---|---|---|---|
| 6,822,960 B1 | 11/2004 | Manchester et al. | |
| 9,560,394 B2 * | 1/2017 | Giladi | H04L 67/108 |
| 9,723,089 B2 * | 8/2017 | Sadhu | G06Q 30/02 |
| 2012/0191628 A1 * | 7/2012 | Bugenhagen | G06Q 30/0283 |
| | | | 705/400 |

(Continued)

FOREIGN PATENT DOCUMENTS

| | | |
|---|---|---|
| CN | 102316022 A | 1/2012 |
| CN | 104283643 A | 1/2015 |

OTHER PUBLICATIONS

"Open Network Operating System (ONOS)", © 2016 ONOS [online]. [archived on Oct. 2, 2016]. Retrieved from the Internet: <URL: https://web.archive.org/web/20161002195307/http://onosproject.org/>, (2016), 6 pgs.

(Continued)

*Primary Examiner* — James E Springer
(74) *Attorney, Agent, or Firm* — Schwegman Lundberg & Woessner, P.A.

(57) ABSTRACT

Various embodiments include devices and methods structured to provide an intelligent event processing offload, which can facilitate an efficient, geo-distributed tiered scalable event streaming and processing interconnect through an embedded adapter interconnect. Event streams received in a data handler from one or more networks can be separated into partitions. The loading of the event streams into the partitions can be tracked to balance the loading by controlling the number of partitions used. Packets of each partition can be sent to a respective reactive router that resides in a controlling application for further processing. Additional devices, systems, and methods can be implemented in a variety of applications.

17 Claims, 17 Drawing Sheets

(56) References Cited

U.S. PATENT DOCUMENTS

| | | | | |
|---|---|---|---|---|
| 2015/0134795 | A1* | 5/2015 | Theimer | G06F 16/254 709/223 |
| 2018/0060143 | A1* | 3/2018 | Uttamchandani | G06F 3/067 |
| 2018/0124812 | A1* | 5/2018 | Thubert | H04W 72/1263 |
| 2018/0173451 | A1* | 6/2018 | Uttamchandani | G06F 12/0292 |
| 2019/0327297 | A1* | 10/2019 | Madani | H04L 67/1051 |

OTHER PUBLICATIONS

"OpenDaylight", [online]. [archived on Dec. 16, 2016]. Retrieved from the Internet: <URL: https://web.archive.org/web/20161216001143/https://www.opendaylight.org/>, (2016), 4 pgs.

Dhody, D., et al., "Packet Optical Integration (POI) Use Cases for Abstraction and Control of TE Networks (ACTN)", Networking Working Group, (Oct. 28, 2016), 15 pgs.

Jampani, Madan, et al., "ONOS Building a Distributed, Network Operating System", BANV ,Meetup, (Mar. 16, 2015), 91 pgs.

Kumar, Alok, et al., "BwE: Flexible, Hierarchical Bandwidth Allocation for WAN Distributed Computing", SIGCOMM '15, Aug. 17-21, 2015, London, United Kingdom, (2015), 14 pgs.

Russinovich, Mark, "Microsoft Azure: SDN in a Hyperscale Cloud", Microsoft, (2016), 29 pgs.

"International Application Serial No. PCT/CN2018/073239, International Search Report dated Apr. 12, 2018", 4 pgs.

"International Application Serial No. PCT/CN2018/073239, Written Opinion dated Apr. 12, 2018", 3 pgs.

Lin, Pingping, et al., "EWBridge: East-West Bridge for Heterogeneous SDN NOSes Peering", [online]. [archived on Aug. 29, 2017]. Retrieved from the Internet: <URL: https://web.archive.org/web/20170829230734/https://cdn.ttgtmedia.com/rms/pdf/east-west_bridge_white.pdf>, (2017), 3 pgs.

Reddi, Vijay J., et al., "Persistent Code Caching: Exploiting Code Reuse Across Executions and Applications", *International Symposium on Code Generation and Optimization (CGO'07)*, Mar. 11-14, 2007, (2007), 13 pgs.

* cited by examiner

US 10,594,760 B2

INTELLIGENT EVENT STREAMING

RELATED APPLICATION

This application claims the benefit of U.S. Provisional Application Ser. No. 62/450,561, filed 25 Jan. 2017, which is incorporated herein by reference in its entirety.

FIELD OF THE INVENTION

The present disclosure is related to data communication and, in particular, event streaming.

BACKGROUND

Software defined networks (SDNs) and Internet of things (IoT) networks are maturing and transforming with respect to scale and geographical-distribution (geo-distribution). Practical deployments, which should include integration with existing and legacy networks, need to accompany such transformations. SDN and IoT networks are centralized and use one-to-one client-server connections to communicate. As a result, event streaming and intelligent processing of streaming data across data plane, control plan, and management is cumbersome for these centralized controlling applications. An event is an identifiable occurrence that is recognized by system hardware or software. An event can represent a message, token, count, pattern, or a value that can be detected within an ongoing stream of monitored inputs such as network traffic or other inputs. In addition, using dedicated connections for leadership election and data synchronization for event streaming can cause consistency and synchronization issues in a geo-distributed deployment.

Current solutions, like Open Network Operating System (ONOS)/ OpenDaylight (ODL), are inefficient as they waste compute/infra processing resources in event processing. Subsequently, SDN and IoT applications face challenges for geo-distribution, scaling, and efficiency in event stream processing across control, data, operations, and management.

SUMMARY

A load balancer accepts incoming discretely sourced event streams and separates them into streams by dividing the streams into different so-called partitions based on stream topics and, optionally, other factors. A partition can be implemented by a first-in, first-out queue, for instance, so that as each packet for a partition is received it is inserted into the tail of that partition's queue. Generally speaking, a stream topic is a label or identifier for a stream. In some embodiments, a stream topic comprises an identifier of the protocol of information carried in the payload of packets of the stream (e.g., Simple Network Management Protocol, OpenFlow protocol, etc.) and the source network address of packets in the stream. For example, a stream of SNMP packets originating from the same source network would be the same topic for purposes of partitioning even though the individual payloads of the SNMP packets might differ. In some implementations, a particular topic can be replicated to more than one partition for purposes of fail-over should one partition become unavailable.

The packets of each partition are sent to a respective "reactive" router that resides in a controlling application for further processing. The reactive router in a given controlling application looks within each packet's payload (e.g., the SNMP payload) to determine a module of the controlling application to process the packet. The module implements a routine or process that knows how to process packets of a particular kind. Each module has an input queue. Once the reactive router examines a given packet's payload, the router will know which module's input queue to insert the packet into. If the queues become unbalanced, the router can create additional queues and additional modules for the queues so that no one handler becomes too backlogged. In some implementations, a handler to route packets to a reactive router of yet another controlling application.

According to one aspect of the present disclosure, there is provided a device operable to handle event streams for processing that includes: a memory storage comprising instructions; and one or more processors in communication with the memory storage, wherein the one or more processors execute the instructions to perform operations comprising: receiving event streams in a data handler, each event stream originating from a respective source network; separating the event streams from the data handler into partitions based on topics of the streams; tracking loading of the event streams into the partitions to balance the loading by controlling the number of partitions used; and sending packets of each partition, associated with the event streams, to a respective reactive router that resides in a controlling application.

Optionally, in any of the preceding aspects, another implementation of the aspect provides that the device includes the tracking to include tracking input throughput peaks and output throughput peaks of the partitions, and resizing partition count based on captured peak values and differences with respect to a maximum throughput using heuristics and close loop control.

Optionally, in any of the preceding aspects, a further implementation of the aspect provides that the device includes the differences with respect to a maximum throughput are differences between a maximum ceiling throughput and measured input throughput.

Optionally, in any of the preceding aspects, a further implementation of the aspect provides that the device includes the operations to include examining, by the respective reactive router, a payload of each packet and determining a module of the controlling application to process the packet based on the examination; and inserting, by the reactive router, each packet into an input queue of the determined module.

Optionally, in any of the preceding aspects, a further implementation of the aspect provides that the device includes the operations to include creating one or more additional queues, by the respective reactive router, when one or more input queues of modules of the controlling application become unbalanced.

Optionally, in any of the preceding aspects, a further implementation of the aspect provides that the device includes the operations to include re-directing packets, by the respective reactive router, using a payload filter policy that includes a quality of service parameter and peer information.

Optionally, in any of the preceding aspects, a further implementation of the aspect provides that the device includes the operations to include the respective reactive router selectively distributing individual packets to software defined network (SDN) and/or Internet of things (IoT) network nodes using a cache that maintains registration of the SDN and/or IoT network nodes based on domains.

According to one aspect of the present disclosure, there is provided a computer-implemented method that includes: receiving event streams, each event stream originating from a respective source network; separating the event streams into partitions based on topics of the streams; tracking the loading of the event streams into the partitions to balance the loading by controlling the number of partitions used; and sending packets of each partition, associated with the event streams, to a respective reactive router that resides in a controlling application.

Optionally, in any of the preceding aspects, another implementation of the aspect provides that the computer-implemented method includes the tracking to include tracking input throughput peaks and output throughput peaks of the partitions, and resizing partition count based on captured peak values and differences with respect to a maximum throughput using heuristics and close loop control.

Optionally, in any of the preceding aspects, a further implementation of the aspect provides that the computer-implemented method includes the differences with respect to a maximum throughput being differences between a maximum ceiling throughput and measured input throughput.

Optionally, in any of the preceding aspects, a further implementation of the aspect provides that the computer-implemented method includes examining, by the respective reactive router, a payload of each packet and determining a module of the controlling application to process the packet based on the examination; and inserting, by the reactive router, each packet into an input queue of the determined module.

Optionally, in any of the preceding aspects, a further implementation of the aspect provides that the computer-implemented method includes creating one or more additional queues, by the respective reactive router, when one or more input queues of modules of the controlling application become unbalanced.

Optionally, in any of the preceding aspects, a further implementation of the aspect provides that the computer-implemented method includes re-directing packets, by the respective reactive router, using a payload filter policy that includes a quality of service parameter and peer information.

Optionally, in any of the preceding aspects, a further implementation of the aspect provides that the computer-implemented method includes the respective reactive router selectively distributing individual packets to software defined network (SDN) and/or Internet of things (IoT) network nodes using a cache that maintains registration of the SDN and/or IoT network nodes based on domains.

According to one aspect of the present disclosure, there is provided a non-transitory computer-readable medium that stores computer instructions, that when executed by one or more processors, cause the one or more processors to perform the operations of: receiving event streams, each event stream originating from a respective source network; separating the event streams into partitions based on topics of the streams; tracking the loading of the event streams into the partitions to balance the loading by controlling the number of partitions used; and sending packets of each partition, associated with the event streams, to a respective reactive router that resides in a controlling application.

Optionally, in any of the preceding aspects, another implementation of the aspect provides that the non-transitory computer-readable medium includes the tracking to include tracking input throughput peaks and output throughput peaks of the partitions, and resizing partition count based on captured peak values and differences with respect to a maximum throughput using heuristics and close loop control.

Optionally, in any of the preceding aspects, a further implementation of the aspect provides that the non-transitory computer-readable medium includes operations to include examining, by the respective reactive router, a payload of each packet and determining a module of the controlling application to process the packet based on the examination; and inserting, by the reactive router, each packet into an input queue of the determined module.

Optionally, in any of the preceding aspects, a further implementation of the aspect provides that the non-transitory computer-readable medium includes operations to include creating one or more additional queues, by the respective reactive router, when one or more input queues of modules of the controlling application become unbalanced.

Optionally, in any of the preceding aspects, a further implementation of the aspect provides that the non-transitory computer-readable medium includes operations to include re-directing packets, by the respective reactive router, using a payload filter policy that includes a quality of service parameter and peer information.

Optionally, in any of the preceding aspects, a further implementation of the aspect provides that the non-transitory computer-readable medium includes operations to include the respective reactive router selectively distributing individual packets to software defined network (SDN) and/or Internet of things (IoT) network nodes using a cache that maintains registration of the SDN and/or IoT network nodes based on domains.

According to one aspect of the present disclosure, there is provided a device that includes: a first cache to store registration of a topic from an originating application and to register a set of applications to receive data of the topic; a second cache to store data of the topic from the originating application; a reactive router associated with the originating application and arranged to operatively push the data from the originating application to the second data cache from which the data is streamed to the application of the set registered to receive data of the topic; and one or more processors to execute functions of the first cache, the second cache, and the reactive router.

Optionally, in any of the preceding aspects, another implementation of the aspect provides that the device includes a durable data cache to store historical tracking data regarding the data pushed from the originating application.

Optionally, in any of the preceding aspects, a further implementation of the aspect provides that the device includes the reactive router operable to redefine a payload structure of the data.

Optionally, in any of the preceding aspects, a further implementation of the aspect provides that the device includes a metadata repository that maintains a payload filter policy to redefine the payload structure.

Optionally, in any of the preceding aspects, a further implementation of the aspect provides that the device includes the payload filter policy to include a quality of service parameter and peer information.

Optionally, in any of the preceding aspects, a further implementation of the aspect provides that the device includes the reactive router operable to dynamically resize queues that bucket events, in which each incoming stream of events is processed with respect to an adjustable upper maximum threshold in each queue, the upper maximum threshold updated dynamically for a number of concurrent streams based on heuristics data and close loop control feedback.

According to one aspect of the present disclosure, there is provided a computer-implemented method that includes: storing, in a first cache, registration of a topic from an originating application and registering, in the first cache, a set of applications to receive data of the topic; and pushing data from the originating application, using a reactive router associated with the originating application, to a second data cache from which the data is streamed to the applications of the set registered to receive data of the topic.

Optionally, in any of the preceding aspects, another implementation of the aspect provides that the computer-implemented method includes storing historical tracking data regarding the data pushed from the originating application.

Optionally, in any of the preceding aspects, a further implementation of the aspect provides that the computer-implemented method includes redefining a payload structure of the data, using the reactive router.

Optionally, in any of the preceding aspects, a further implementation of the aspect provides that the computer-implemented method includes maintaining, in a metadata repository, a payload filter policy to redefine the payload structure.

Optionally, in any of the preceding aspects, a further implementation of the aspect provides that the computer-implemented method includes the payload filter policy to include a quality of service parameter and peer information.

Optionally, in any of the preceding aspects, a further implementation of the aspect provides that the computer-implemented method includes dynamically resizing queues that bucket events, using the reactive router, in which each incoming stream of events is processed with respect to an adjustable upper maximum threshold in each queue, the upper maximum threshold updated dynamically for a number of concurrent streams based on heuristics data and close loop control feedback.

According to one aspect of the present disclosure, there is provided a device that includes: a node controller operable as a Raft based controller; a handler embedded with the node controller; a cache operatively coupled to the handler to engage in a selected multicast to registered peers, each registered peer having a Raft based controller; and one or more processors to execute functions of the node controller, the handler, and the cache.

Optionally, in any of the preceding aspects, another implementation of the aspect provides that the device includes the cache to include a repository of metadata of stream topics and registration of the registered peers.

Optionally, in any of the preceding aspects, a further implementation of the aspect provides that the device includes the Raft based controller being an elected leader of the registered peers based on a map of RAFT peer to peer nodes of a group including the controller and the registered peers, topics, quality of service parameters, and peer information maintained in the cache.

According to one aspect of the present disclosure, there is provided a computer-implemented method that includes: operating a node controller as a Raft based controller with a handler embedded with the node controller; and engaging, using the handler coupled with a cache, in a selected multicast to registered peers, each registered peer having a Raft based controller.

Optionally, in any of the preceding aspects, another implementation of the aspect provides that the computer-implemented method includes the cache to include a repository of metadata of stream topics and registration of the registered peers.

Optionally, in any of the preceding aspects, a further implementation of the aspect provides that the computer-implemented method includes implementing the node controller as an elected leader of the registered peers based on a map of RAFT peer to peer nodes of a group including the controller and the registered peers, topics, quality of service parameters, and peer information maintained in the cache.

DETAILED DESCRIPTION

Figure 1:
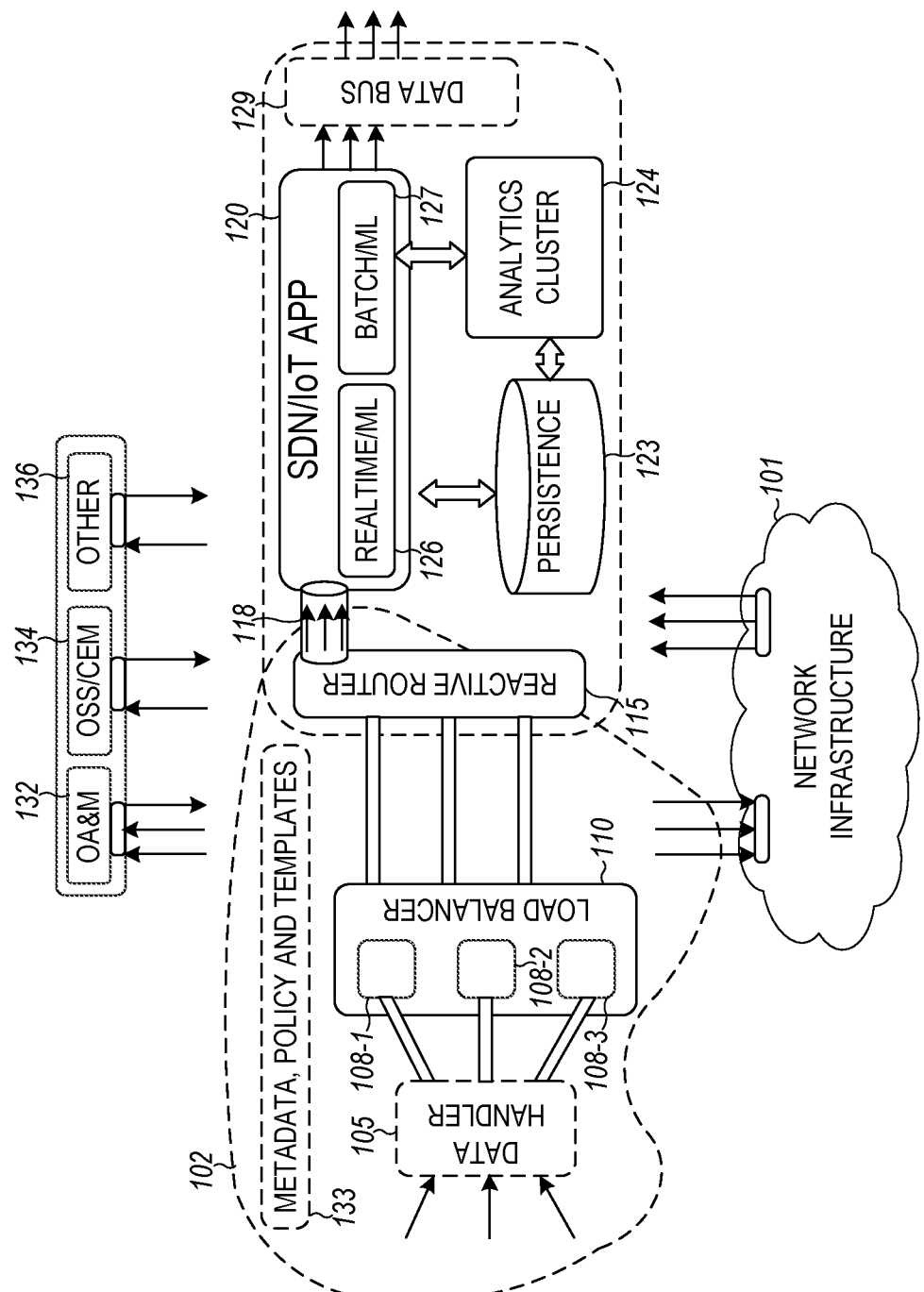
FIG. 1 is a representation of an offload engine arranged to operate with a SDN/IoT controller/application, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense.

The functions or algorithms described herein may be implemented in software in an embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The computer-readable non-transitory media includes all types of computer readable media, including magnetic storage media, optical storage media, and solid state storage media and specifically excludes signals. It should be understood that the software can be installed in and sold with the devices that handle event streams as taught herein. Alternatively the software can be obtained and loaded into such devices, including obtaining the software via a disc medium or from any manner of network or distribution system, including, for example, from a server owned by the software creator or from a server not owned but used by the software creator. The software can be stored on a server for distribution over the Internet, for example.

In various embodiments, a streaming event processing offload engine can partition input events into separate streams that are to be processed by one or more applications thereby reducing the processing load for the applications. For instance, with a number of different inputs to be processed by different functional modules of an application, the offload engine can separate the inputs into partitions from which the inputs can then be directed to the appropriate application module. This load balance partitioning provides an approach for a controller to facilitate intelligent and reliable stream processing across hierarchical tiers and geo-distributed networks. Such a streaming event processing offload engine can be realized as a separate stream processing offload device that can provide an end to end, geo-distributed, peer-to-peer (P2P) publish, subscribe, and load balancing. The offload engine can provide highly available interconnect for streaming data transport and processing. Herein, methods and devices to direct streaming event processing to a separate intelligent offload engine to support SDN controllers and other applications in the SDN and/or IoT (SDN/IoT) network are disclosed. This approach can provide an efficient interconnect for many-to-many SDN/IoT controller/applications.

FIG. 1 is a representation of an offload engine 102 arranged to operate with a SDN/IoT controller/application 120 to offload bulk processing of a large number of streaming events from processing by SDN/IoT controller/application 120. Offload engine 102 can comprise a data handler 105, a load balancer 110, and a reactive router 115. Data handler 105 provides a means for receiving event streams and providing the event streams to partitions based on topics of the streams. The event streams can be peer-to-peer event streams. A stream is a continuous set of events with associated time stamps. An example is a set of temperature readings with associated times from a probe in a network. Another example is port interface providing up or down status event notifications. Another example of a stream comprises messages of one or more channels in a publication-subscription ("PubSub") network. Data handler 105 can include a data bus to receive event streams.

Load balancer 110 provides a means for balancing distribution of the event streams among a set of partitions, which may include, but is not limited to, balancing the distribution based on the topics of the event streams. The balancing can be conducted based on the amount of streams received. Load balancer 110 can accept incoming discretely sourced event streams and separate them by dividing the event streams into different partitions based on stream topics and, optionally, other factors. A partition can be implemented by a first-in, first-out queue, for instance, so that as each packet for a partition is received it is inserted into the tail of that partition's queue. Generally speaking, a stream topic is a label or identifier for a stream. In some embodiments, a stream topic comprises an identifier of the protocol of information carried in the payload of packets of the stream (e.g., Simple Network Management Protocol, OpenFlow protocol, etc.) and the source network address of packets in the stream. For example, a stream of SNMP packets originating from the same source network would be the same topic for purposes of partitioning even though the individual payloads of the SNMP packets might differ. In some implementations, a particular topic can be replicated to more than one partition for purposes of fail-over should one partition become unavailable.

Reactive router 115 can reside in a controlling application for further processing of packets of each partition sent to reactive router 115. Reactive router 115 in a given controlling application can look within each packet's payload (e.g., the SNMP payload) to determine a module of the controlling application to process the packet. The module implements a routine or process that knows how to process packets of a particular kind. Each module has an input queue. Once reactive router 115 examines a given packet's payload, reactive router 115 will know which module's input queue to insert the packet into. If the queues become unbalanced, reactive router 115 can create additional queues and additional modules for the queues so that no one handler becomes too backlogged. In some implementations, a handler of reactive router 115 routes packets to a reactive router of yet another controlling application.

Reactive router 115 can be operably coupled to load balancer 110. Data handler 105, load balancer 110, and reactive router 115 can be realized as software, which deployed is a set of physical entities providing instructions that, when executed, causes performance of the functions of data handler 105, load balancer 110, and reactive router 115. Data handler 105, load balancer 110, and reactive router 115 can be realized as software and hardware to store the instructions and execute the functions of data handler 105, load balancer 110, and reactive router 115. The offload engine 102 can be coupled with an adapter, which is a device that couples different entities that cannot be directly connected. The adapter may be realized with or as software that can read packets from different protocol stacks, like SNMP, TCP/IP, etc. The adapter may be an embedded adapter. An embedded adapter provides adapter functionality but is implemented as a module inside a larger input/out traffic handler for a network element or an application. An embedded adapter is capable of being embedded in network equipment, network controllers, and other related devices. Portions of offload engine 102 can be integrated with its corresponding embedded adapter.

One or more devices can be implemented to perform one or more functions of offload engine 102. For example, a device, operable to handle event streams for processing, can comprise a memory storage, comprising instructions, and one or more processors in communication with the memory storage, wherein the one or more processors execute the instructions to perform operations related to the functions of offload engine 102. The operations can comprise receiving event streams in a data handler, each event stream originating from a respective source network, and separating the event streams from the data handler into partitions based on topics of the streams. The event streams can be peer-to-peer event streams. Such operations may be part of functions of data handler 105 and/or load balancer 110. The loading of the event streams into the partitions can be tracked to balance the loading by controlling the number of partitions used, which functions may be executed as part of load balancer 110. Packets of each partition, associated to the event streams, can be sent to a respective reactive router, such as reactive router 115, which resides in a controlling application.

Operations corresponding to load balancer 110 can include tracking input throughput peaks and output throughput peaks of the partitions, and resizing partition count based on captured peak values and differences with respect to a maximum throughput using heuristics and close loop control. The differences with respect to a maximum throughput can be differences between a maximum ceiling throughput and measured input throughput.

The operations executed by a processor can include examining, by the respective reactive router such as reactive router 115, a payload of each packet and determining a module of the controlling application to process the packet based on the examination. Operations can also include inserting, by the respective reactive router such as reactive router 115, each packet into an input queue of the determined module. The operations can include creating one or more additional queues, by the respective reactive router such as reactive router 115, when one or more input queues of modules of the controlling application become unbalanced.

The operations executed by a processor can include re-directing packets, by the respective reactive router such as reactive router 115, using a payload filter policy that includes a quality of service parameter and peer information. The operations executed by a processor can include the respective reactive router, such as reactive router 115, selectively distributing individual packets to software defined network (SDN) and/or Internet of things (IoT) network nodes using a cache that maintains registration of the SDN and/or IoT network nodes based on domains. A cache is hardware and/or software that stores data such that responses to requests for the data can be completed relatively quickly. In some instances, a cache may be used to store forms of data in a temporary manner dependent on the application. Data in a computing environment can be cached to shorten access time to the data, reduce latency, and enhance input/output associated with the data.

A large number of topic streams can be handled by offload engine 102. In this example, topic streams 108-1, 108-2, and 108-3 are shown input to offload engine 102 as indicated by the arrows pointing into data handler 105. Input to offload engine 102 by topic streams 108-1, 108-2, and 108-3 can be from a network infrastructure 101, where the arrows shown to and from network infrastructure 101 indicate bi-directional flow, with the streams input to offload engine 102 via data handler 105. An embedded adapter can be used to facilitate transfer via data handler 105. Network infrastructure 101 can include, among other things, a data bus and data model. Input to offload engine 102 via data handler 105 may also be from a virtual machine (VM) and/or a virtual network function (VNF).

In this example, interconnect between offload engine 102 and network infrastructure 101 is an interconnect between offload engine 102 and a southbound domain. Offload engine 102 can have an interconnect with a northbound domain. A domain refers to a group of users, workstations, devices, printers, computers and database servers that share different types of data via network resources. A southbound (SB) interconnect (or interface) enables communication with network nodes (both physical and virtual switches and routers) so that the router can discover network topology, define network flows, and implement requests relayed to it via northbound application program interfaces (APIs). A northbound (NB) interconnect (or interface) enables communication with applications or higher layer control programs. For example, offload engine 102 can interact with operation administration and maintenance (OA&M) 132, operations support system/customer experience management (OSS/CEM) 134 and other 136 similar entities in a northbound domain Metadata, Policies, and templates 133 can be transferred between offload engine 102 and OA&M 132.

Data handler 105 directs topic streams 108-1, 108-2, and 108-3 to load balancer 110 based on topics of the streams. Selected streams input to offload engine 102 can be routed to SDN/IoT controller/application 120 by offload engine 102 via reactive router 115. The routing to SDN/IoT controller/application 120 can be in a tunneled payload stream 118. SDN/IoT controller/application 120 can include real-time machine language (ML) 126 and batch ML 127. SDN/IoT controller/application 120 may be operable with respect to a persistent database 123 and an analytics cluster 124. SDN/IoT controller/application 120 can be associated with various software development kits (SDKs) and APIs. With the offload engine 102 reducing the loading of SDN/IoT controller/application 120, SDN/IoT controller/application 120 can focus its resources on its primary application functions.

SDN/IoT controller/application 120 can include a data bus 129 to output the results of executing its functions.

Figure 2:
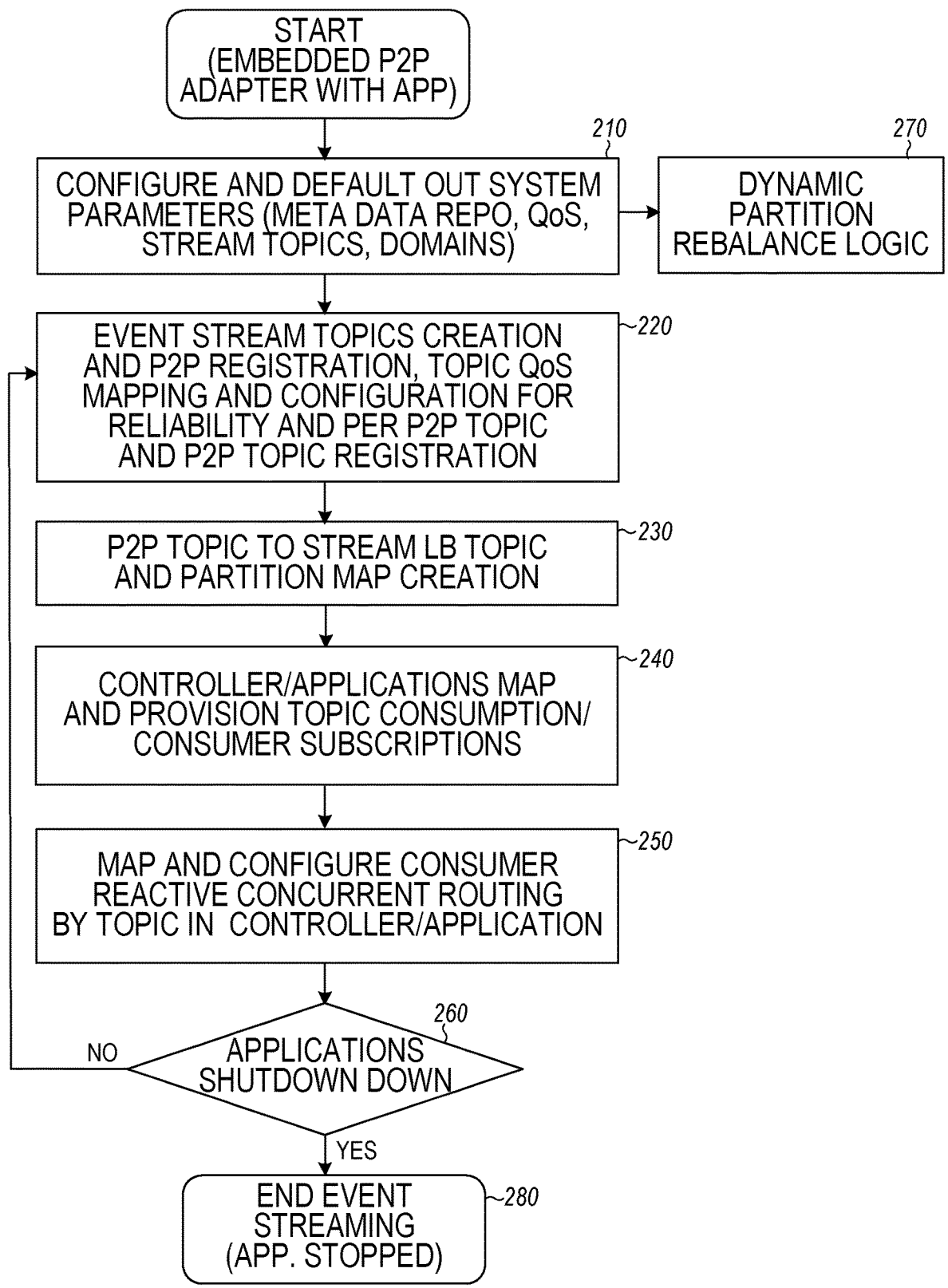
FIG. 2 is a flow diagram of features of an example operation of an example event streaming offload engine, according to an example embodiment.

FIG. 2 is a flow diagram of features of an embodiment of an example operation of an example event streaming offload engine. At 210, system parameters are configured and defaults are established. The configurations can include configurations for a metadata repository, quality of service (QoS) parameters, stream topics, and domains Quality of service relates to one or more aspects of a network connection, such as capacity, coverage of a network, guaranteed maximum blocking probability, outage probability, service response time, loss, signal-to-noise ratio, crosstalk, echo, interrupts, frequency response, loudness levels, and so on.

At 220, event stream topics can be created and P2P registrations can be made. Topic QoS mapping is conducted, where topic QoS mapping refers to associating quality of service to a topic. Associating quality of service to a topic can be implemented per P2P topic. QoS can provide for reliability to be implemented, for example, by a retransmission mechanism between the peers when QoS for a given topic is not met. The topics, association (map) of QoS to topic, and P2P topic registration can be stored in the metadata repository. At 230, association of P2P topics to be streamed to topics to be handled by a load balancer is created and partitions can be created. Partitions may be generated based on the topics of streams. Received streams can be separated into the partitions in accordance with the stored association (map) of P2P topics to be streamed to topics to be handled by the load balancer. At 240, controller/applications are associated with topics and topics to subscriptions are provisioned. Subscriptions can include consumer subscriptions to specified streams. These associations can also be stored in the metadata repository. At 250, reactive concurrent routing is associated with and configured by topic in a controller/application. At 260, a determination is made as to whether the applications shutdown. If not, creation of event stream topics can continue from 220 in the procedure. As new topics are created in the network, the associations and configurations can grow and are stored. At 270, logic can be implemented to conduct partition rebalancing dynamically. At 280, the event streaming is ended, which can be with the application stopping.

This operation of an event streaming offload engine facilitates an efficient, geo-distributed tiered scalable event streaming and processing interconnect through an embedded adapter interconnect. This operation can include operation of an offload event processing ingestion application, which interconnects P2P event streams to a load balancing stream handling application. Such offload engine can provide dynamic scaling and load balancing resize per event streaming load. It also can provide a mechanism to interconnect peers per event stream topic and payload, and can facilitate reliable stream flow across geo-distributed networks per QoS policies.

Figure 3:
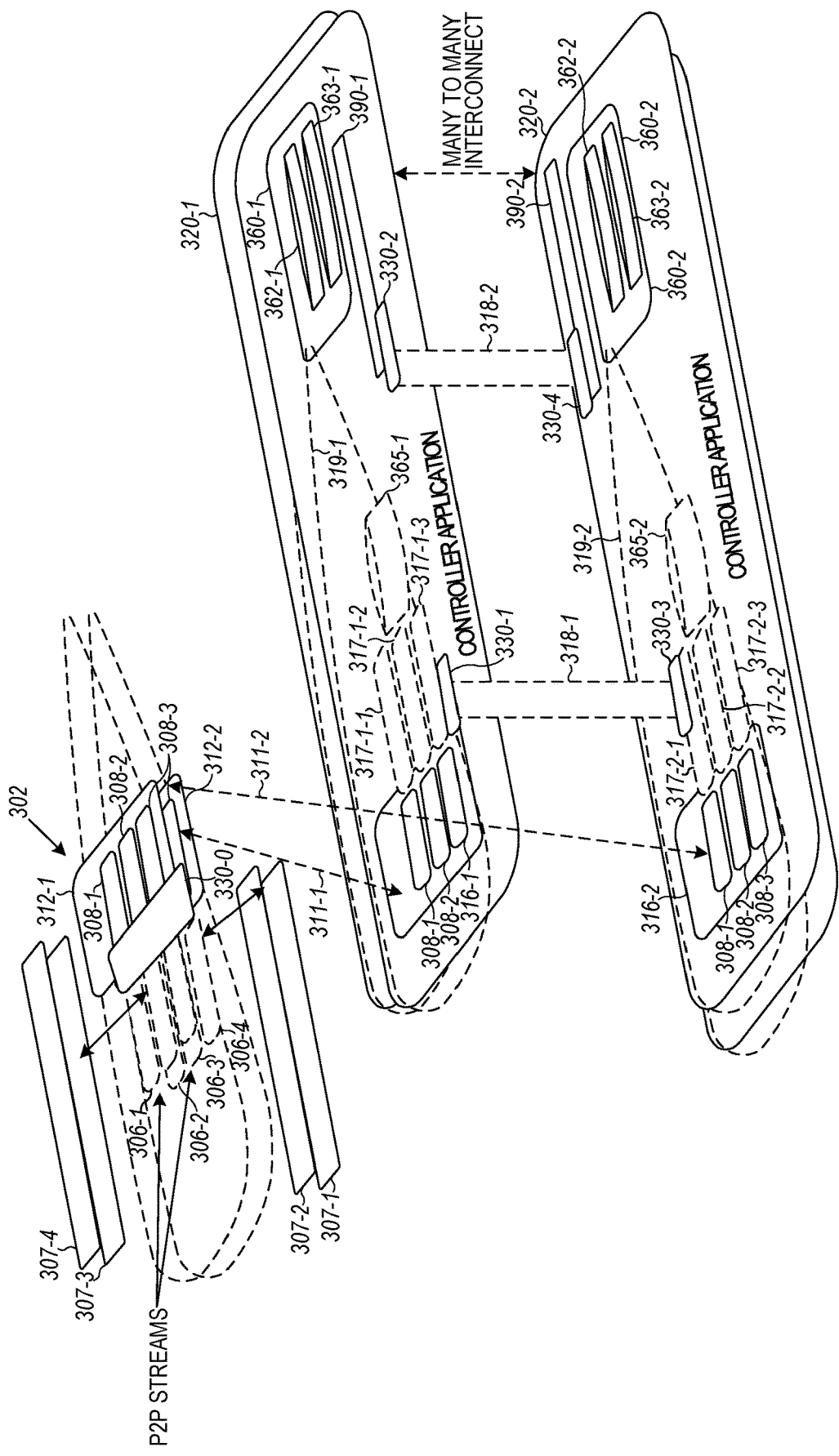
FIG. 3 is a representation of an example intelligent event offload engine and interconnects with a number of controller/applications, according to an example embodiment.

FIG. 3 is a representation of an example of an embodiment of an intelligent event offload engine and interconnects with a number of controller/applications. Event offload engine 302 can be structured similar or identical to offload engine 102 of FIG. 1. Though event offload engine 302 can be configured to be operable with more than two controller/applications, two controller/applications 320-1 and 320-2 are shown in this example. P2P streams can be provided to event offload engine 302 from a NB overlay network and a SB underlay network. SB streaming publish or subscribe (Pub/Sub) entities 307-1 and 307-2 and NB Pub/Sub entities 307-3 and 307-4 provide P2P streams to embedded adapter 330-0 for event offload engine 302. Topics A-C of domain 306-1, topics D-G of domain 306-2, topics H-Z of domain 306-3, and topics H-Z of domain 306-4 are provided to dynamic load balancing sinks 312-1 and 312-2 of event through embedded adapter 330-0. Dynamic load balancing sinks 312-1 and 312-2 provide sets of partitions for a load balancer of event offload engine 302. The partitions may be realized as queues. In dynamic load balancing sinks 312-1 and 312-2 the topics can be partitioned such that the topics can be effectively sliced by a consumer into topics A-C 308-1, topics D-G 308-2, and topics H-Z 308-3. To use a reactive router function of event offload engine 302, topics A-C 308-1 and topics D-G 308-2 can be routed as selective stream subscriptions to sink 316-1 of controller/application 320-1, which provides queues for a reactive router in controller/application 320-1. Topics A-C 308-1, topics D-G 308-2, and topics H-Z 308-3 can be routed as selective stream subscription to sink 316-2 of controller/application 320-2 which provides queues for a reactive router in controller/application 320-2.

Topics A-C 308-1 and topics D-G 308-2 can be transferred to data stores 360-1 of controller/application 320-1 by data streaming/store path 319-1. Data stores 360-1 can include configuration parameters 362-1 and operational parameters 363-1. Routing may be conducted with routing requests 317-1-1, 317-1-2, and 317-1-3 as part of a reactive router for event offload engine 302. Controller/application 320-1 may include a unified modeling language/interactive data language (UML/IDL) data store read/write (R/W) access cache 365-1.

Topics A-C 308-1, topics D-G 308-2, and topics H-Z 308-3 can be transferred to data stores 360-2 of controller/application 320-2 by data streaming/store path 319-2. Data stores 360-2 can include configuration parameters 362-2 and operational parameters 363-2. Routing may be conducted with routing requests 317-2-1, 317-2-2, and 317-2-3 as part of a reactive router for event offload engine 302. Controller/application 320-2 may include a unified modeling language/interactive data language (UML/IDL) data store read/write (R/W) access cache 365-2.

In various embodiments, reactive P2P interconnect 318-1 can be implemented between controller/application 320-1 and controller/application 320-2 via embedded adapters 330-1 and 330-3. Reactive P2P interconnect 318-2 can be implemented between controller/application 320-1 and controller/application 320-2 via embedded adapters 330-2 and 330-4. In another embodiment, controller/application 320-1 can include a copycat RAFT controller 390-1, and controller/application 320-2 can include a copycat RAFT controller 390-2. By copycat, it is meant that controllers 390-1 and 390-2 include functions of a RAFT controller, but are not necessarily implemented with the same limitations as conventional RAFT controllers.

Figure 4:
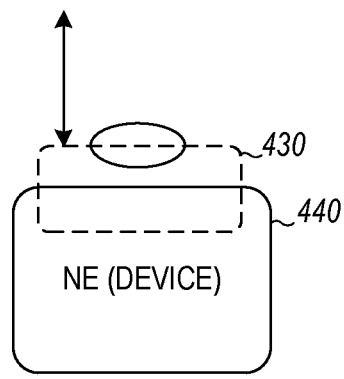
FIG. 4 shows a network element having an embedded adapter structured to communicate with an event offload engine for streaming events, according to an example embodiment.
Figure 5:
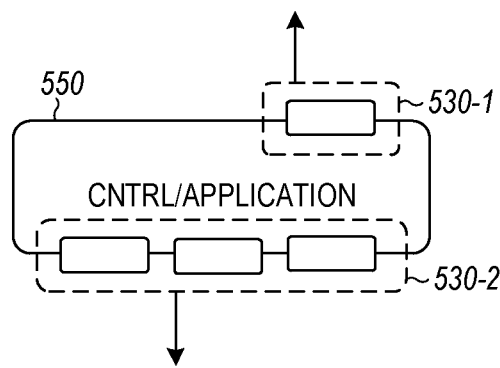
FIG. 5 shows a controller/application having embedded adapter and, which provides communication with entities in different communication directions, according to an example embodiment.
Figure 6:
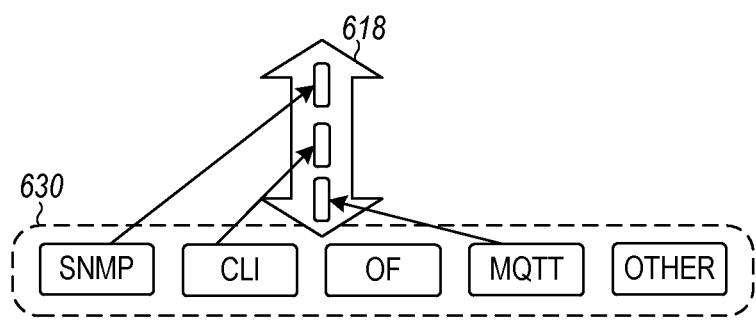
FIG. 6 illustrates embedded protocols as a payload plus topic in embedded adapter that can be transferred through connection with an event offload engine, according to an example embodiment.

Event offload engine 302 can provide key capabilities, which are shortcomings in some conventional networks. For example, event offload engine 302 and similar devices provide a mechanism to embed stream handler in current and next generation network devices as shown in FIGS. 4-6 with embedded adapters for interconnectivity. FIG. 4 shows a network element (NE) 440 having an embedded adapter 430 structured to communicate with an event offload engine for streaming events. An embedded adapter may also be referred to as an embedded handler. Embedded adapter 430 can include logical topic change objects. NE 440 can be arranged within a multi-tier network to provide peer to peer publish/subscribe through the domains in each tier.

FIG. 5 shows a controller/application 550 having embedded adapter 530-1 and 530-2, which provides communication with entities in different communication directions. Controller/application 550 can also be connected for streaming for peer to peer publish/subscribe and to connect to an offload engine. Embedded adapters 530-1 and 530-2 allow for interconnects that can effectively overlay and underlay controller/application 550. Embedded adapters 530-1 and 530-2 may handle of number of different stream events. In this example, while embedded adapter 530-1 handles one streaming topic, embedded adapter 530-2 handles three different streaming topics.

An event offload engine, as taught herein, provides a mechanism to embed different payloads in event streams, providing many to many, many to one, one to one unique peer-to-peer communication of the payloads. This effectively provides a tunneling of the payloads to accommodate heterogeneous SDN/IoT controller/applications. The payloads may correspond to different protocols such as simple network management protocol (SNMP), eXtensible markup language (XML), video, etc., and are examples of different topics. This mechanism enables unique topic based peer to peer communication, which allows access to a payload through an adapter.

FIG. 6 illustrates embedded protocols as a payload plus topic in embedded adapter 630 that can be transferred through connection with an event offload engine. In this example, embedded adapter 630 has legacy and/or emerging protocols SNMP, command-line interface (CLI), OpenFlow (OF), (MQTT) Message Queuing Telemetry Transport, and other protocols, embedded as a payload. Embedded adapter 630 can provide a set of these protocols in a tunneled payload stream 618.

Figure 7:
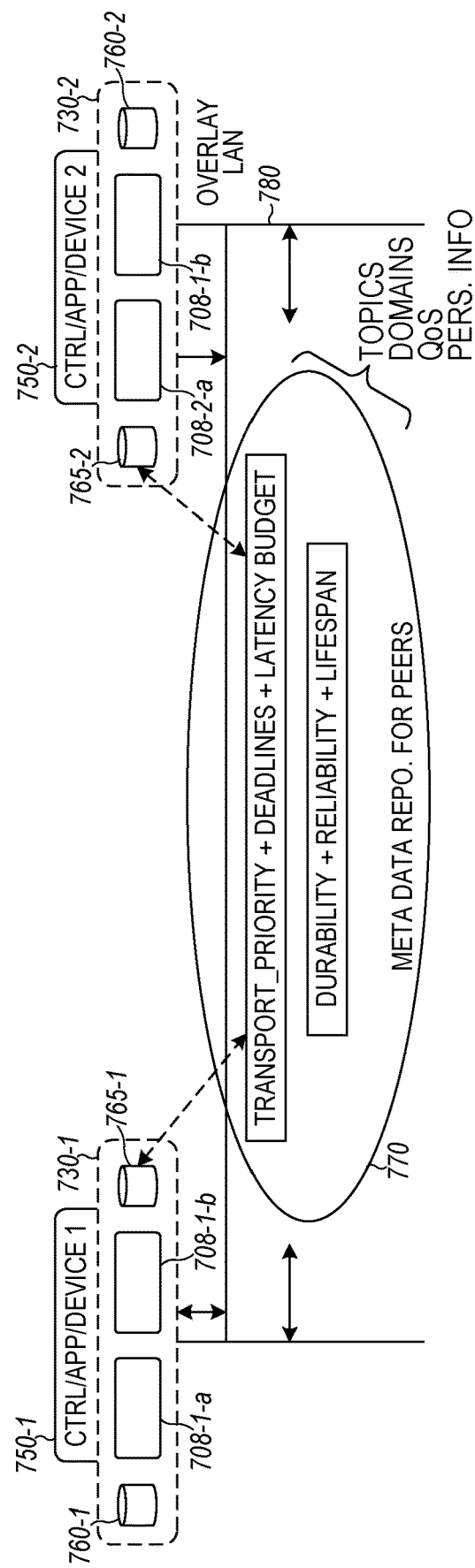
FIG. 7 is a representation of local and central metadata repositories with respect to peer devices, according to an example embodiment.

An event offload engine, as taught herein, facilitates accommodation of heterogeneous SDN/IoT controller/applications across existing and emerging networks by facilitating opaque control of header and payload for transported event stream data. In addition, an event offload engine facilitates handling SDN/IoT functions across control, management, and application domains FIG. 7 is a representation of local and central metadata repositories with respect to peer devices. These repositories can include a quality of service (QoS) mechanism for reliability. As an example, FIG. 7 shows a control/application device 750-1 and a control/application device 750-2 that are peers arranged with respect to an overlay local area network (LAN) 780. Control/application device 750-1 can include a queryable data cache 760-1, an embedded adapter 730-1, topics 708-1-*a* and 708-1-*b*, and local metadata repository 765-1. Control/application device 750-2 can include a queryable data cache 760-2, an embedded adapter 730-2, topics 708-2-*a* and 708-1-*b*, and local metadata repository 765-2. As shown, different devices can include the same topic, for example topic 708-1-*b* in control/application devices 750-1 and 750-2. Each of local metadata repositories 765-1 and 765-2 can include a registration store for metadata that can include registration of peers and a discovery mechanism with respect to peers. Embedded adapters 730-2 and 730-1 provide communication with a central metadata repository 770 associated with an offload engine.

Central metadata repository 770 can include metadata for peers with respect to topics, domains QoS, and peer information. The data with respect to topics, domains. QoS, and peer information can be structured in a hierarchical arrangement. For example, the data can be arranged according to domains, topics within domains, and QoS policies per topic. Other hierarchical arrangements may be implemented. Parameters for each peer can include transport priority, deadlines, latency budget, durability, reliability, and lifespan. Central metadata repository 770 provides a mechanism to reliably and dynamically handle many-to-many streams with node discovery and availability tracking across geo-distributed and latency, jitter challenged network boundaries through QoS configurations.

Figure 8:
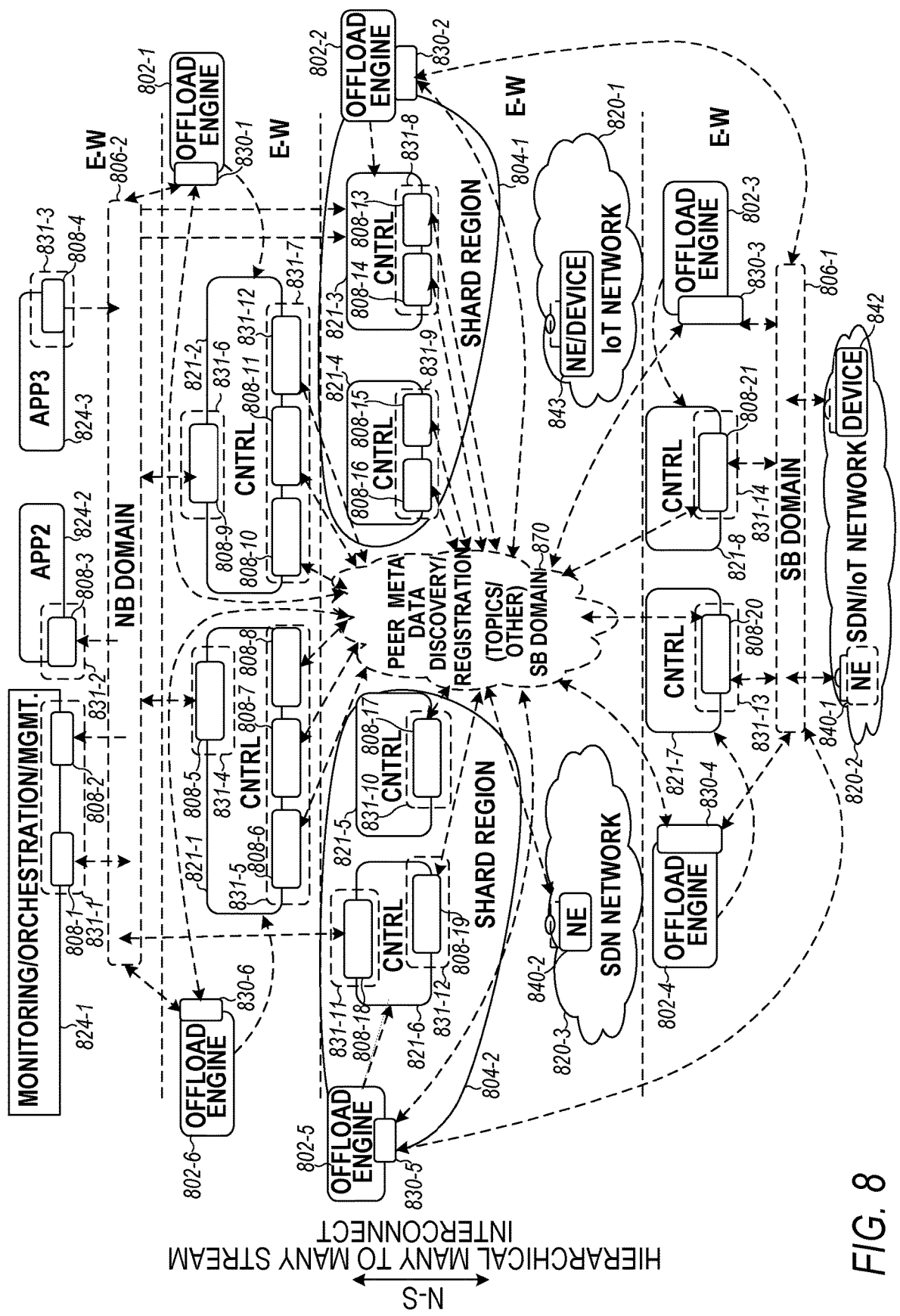
FIG. 8 is an illustration of a hierarchical geo-distributed lightweight controller network providing hierarchical many-to-many stream interconnect, according to an example embodiment.

An intelligent event offload and interconnect, as taught herein, provides a mechanism to handle event stream data across temporal(time) and spatial (location) for SDN/IoT network nodes/entities through time series stream data cache, processing and domain based node registration, as depicted in FIG. 8. From FIG. 2, operation of an event streaming offload engine can include peer-to-peer registry with domain to topic to associated QoS policies. The data handler of the offload engine can include a knowledge table of the domains as a unique identification (ID), and can build a knowledge of all interested peers by a relationship. An example relationship can include, first, each peer becoming part of a domain, as it registers itself with the domain. The domain has unique ID, topics, and QoS association (mapping) information per peer node. Second, the peers need not know the location (spatial) of a stream, the peers have information about the stream topic, on which they publish or to which they subscribe. Third, the mechanism is realized in that each peer creates a meta-data database of domain to topic to QoS in which the respective peer is interested or is an owner thereof, and the respective peer publishes or listens to a stream. Each peer basically does a multicast or a broadcast depending on the configuration on a peer. Each peer stores IP communication related information of another peer upon the other peer's registration to the domain, where this information is explicitly used by the peer for publish/subscribe.

FIG. 8 is an illustration of a hierarchical geo-distributed lightweight controller network providing hierarchical many-to-many stream interconnect. In this example, offload engines 802-1, 802-2, 802-3, 802-4, 802-5, and 802-6 with associated embedded adapters 830-1, 830-2, 830-3, 830-4, 830-5, and 830-6, respectively, provide offload functions, as taught herein, for many-to-many stream interconnect between SB domain 806-1 and NB domain 806-2. Offload engines 802-1, 802-2, 802-3, 802-4, 802-5, and 802-6 can be structured similar to offload engine 102 of Figure. Each of offload engines 802-1, 802-2, 802-3, 802-4, 802-5, and 802-6 operate with respect to data repository 870 for SB domain Data repository 870 includes peer metadata, peer discovery, registration of peers, topics, and other parameters. An offload engine can be placed near each aggregating control/applications. The tiers or levels defined by the dotted lines are east-west (E-W), where E-W is for machine-to-machine traffic.

In the NB domain are monitoring/orchestration/management 824-1 having an embedded adapter 831-1 with topics/protocols 808-1 and 808-2, application 824-2 having an embedded adapter 831-2 with topic/protocol 808-3, and application 824-3 having an embedded adapter 831-3 with topic/protocol 808-4. In the SB domain is a SDN/IOT network 820-2 having a NE 840-1 and a device 842.

In the first tier associated with SB domain, offload engines 802-3 and 802-4 operate with respect to control/applications 821-8 and 821-7, respectively. Control/application 821-8 includes embedded adapter 831-14 and topic/protocol 808-21. Control/application 821-7 includes embedded adapter 831-13 and topic/protocol 808-20. Control/applications 821-8 and 821-7 also operate with respect to data repository 870.

In the first tier from NB domain in the SB direction, offload engines 802-1 and 802-6 operate with respect to control/applications 821-2 and 821-1, respectively. Control/application 821-2 includes embedded adapter 831-6 and topic/protocol 808-9 arranged with respect to NB domain 806-2. Control/application 821-2 also includes embedded adapter 831-17 and topics/protocols 808-10, 808-11, and 808-12 that operate with respect to data repository 870. Control/application 821-1 includes embedded adapter 831-4 and topic/protocol 808-5 arranged with respect to NB domain 806-2. Control/application 821-1 also includes embedded adapter 831-5 and topics/protocols 808-6, 808-7, and 808-8 that operate with respect to data repository 870.

In the middle tier, IOT network 820-1 having a NE/device 843 and SDN network 820-3 having NE 840-2 operate with respect to data repository 870. In this tier are shard regions 804-1 and 804-2. In shard region 804-1, offload engine 802-2 operates with respect to control/application 821-3. Control/application 821-3 includes embedded adapter 831-8 and topic/protocols 808-13 and 808-14 and is arranged to operate with respect to data repository 870. Shard region 804-1 also includes control/application 821-4 that operates with respect to data repository 870. Control/application 821-4 includes embedded adapter 831-9 and topic/protocols 808-15 and 808-16. In shard region 804-2, offload engine 802-5 operates with respect to control/application 821-6. Control/application 821-6 includes embedded adapter 831-11 and topic/protocol 808-18 and is arranged with respect to NB domain 806-2. Control/application 821-6 also includes embedded adapter 831-12 and topic/protocol 808-19, arranged with respect to data repository 870. Shard region 804-2 also includes control/application 821-5 that operates with respect to data repository 870. Control/application 821-5 includes embedded adapter 831-10 and topic/protocols 808-17.

Flow and interconnect between the various elements illustrated in FIG. 8 is shown with the various directed dashed lines. The offload engines 802-1, 802-2, 802-3, 802-4, 802-5, and 802-6 and data repository 870 can operate with other elements as taught herein.

From FIG. 8, it can be seen that a mechanism is provided for hierarchical tiering and partitioning of event stream receiving peering applications for optimal handling of north/south and east/west peering and scale. This may be realized via load balancer 110 of offload engine 102 of FIG. 1 or similar load balancer. Purposeful lightweight controller shards/partitions for the SDN/IoT function across control, management and applications domains can be facilitated.

Figure 9:
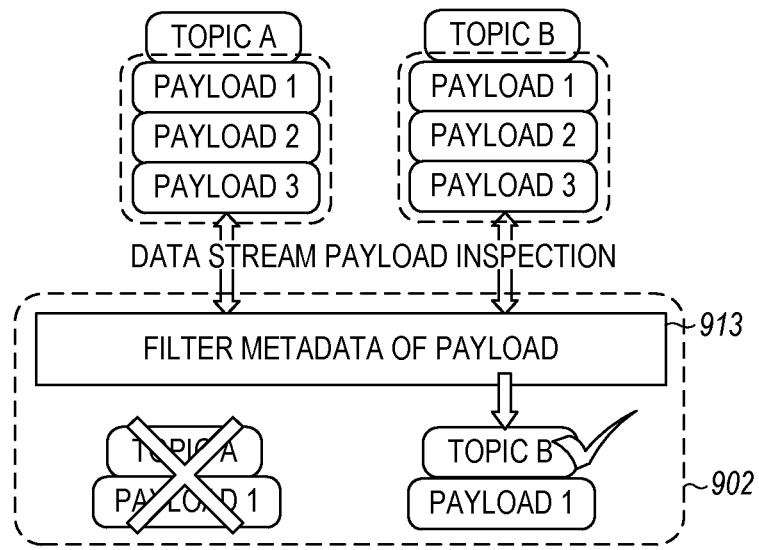
FIG. 9 illustrates application of payload filter policy from metadata, according to an example embodiment.

FIG. 9 illustrates application of payload filter policy from metadata. A filter 913 can be used by an offload engine 902. Filter 913 can be arranged to operate on a per stream per defined payload data basis. Filter 913 can operate to filter based of metadata of a payload. In this example, in a data stream payload inspection, payloads 1-3 of topic A are filtered out, while payloads 1-3 of topic B become part of the accepted payload. Offload engine 902 can provide the capability of processing and re-directing streams per stream per defined payload data by opaquely processing stream data through topic based header and payloads and policy based filter meta data.

Figure 10:
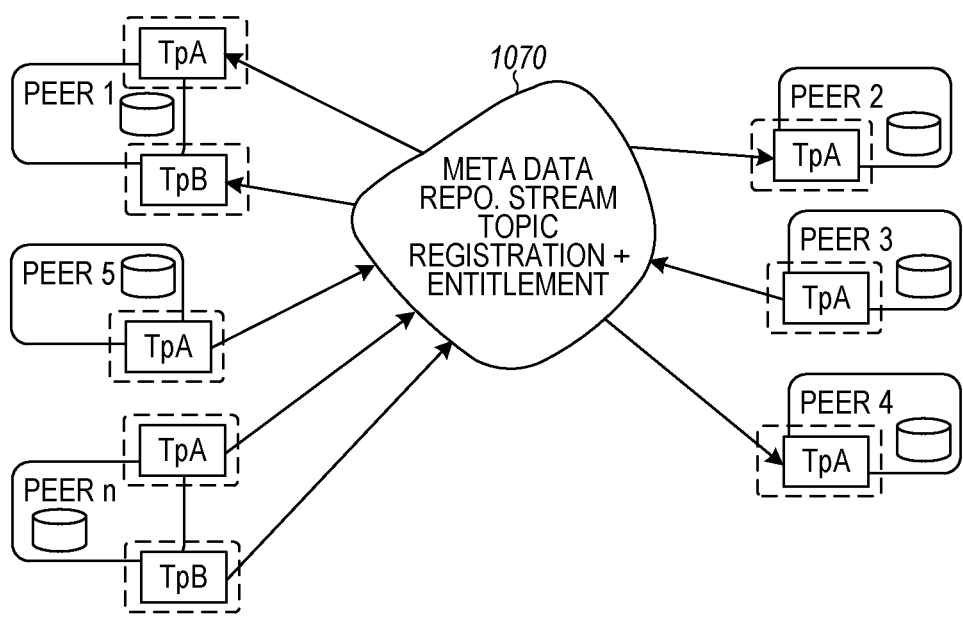
FIG. 10 illustrates an example peer-to-peer entitled topic data stream interconnect, according to an example embodiment.

FIG. 10 illustrates an example of an embodiment of a peer-to-peer entitled topic data stream interconnect. A metadata repository 1070 includes stream topic registration and entitlement information. Metadata repository 1070 may be arranged to be similar to central metadata repository 770 of FIG. 7. The entitlement information can include data that can be used to filter which peers are entitled to engage in streaming of particular topics. In this example, peers 1, 2, 3, 4, 5 . . . n, each having respective databases 1060-1, 1060-2, 1060-3, 1060-4, 1060-4 . . . 1060-*n*, interact using metadata repository 1070 with respect to topic A and topic B. Peer 1 subscribes to and receives topic A published from peer 5, and subscribes to and receives topic B published from peer n. Peer 2 also subscribes to and receives topic A published from peer 5. Peer 3 publishes topic A. Peer 4 subscribes to and receives topic A published from peer n. Peer 5 publishes topic A to which peers 1 and 2 subscribe and receive. Peer n publishes topic A to which peer 4 subscribes and receives, and publishes topic B to which peer 1 subscribes and receives. A component similar or identical to reactive router of FIG. 1 can be used with metadata repository 1070 to perform peer-to-peer entitled topic data stream interconnect. Such an arrangement can provide a mechanism to govern stream publishers and listeners for entitled selective peer-to-peer streaming An offload engine, as taught herein, can provide a mechanism to offload bulk processing by applications, such as SDN/IoT applications, of a large number of discretely sourced event streams to allow separation into focused stream processing as input to such applications. Such an offload engine can be realized with an implementation having three major components. A first component can be structured to receive and handle incoming streams for a P2P publish and/or subscribe. This first component arranged as a data handler may be coupled with an embedded adapter that can provide connections to a data bus. The data handler of the offload engine may be integrated with the embedded adapter. A second component can be structured to dynamically and/or manually load balance streams consistently with high availability (HA) and persistence parameters. A third component can be structured to serially consume load balanced streams concurrently across controller applications. The third component may reactively route the load balanced streams across the controller applications by distributing these load balanced streams based on headers in payloads of the load balanced streams. Further, an offload engine, as taught herein, can enable flexibility of defining payload structure, thus minimizing translation processing downstream or upstream across heterogeneous legacy and emerging networks.

An offload engine, as taught herein, provides capability for seamless east-west scale of SDN applications through load balancing incoming streams by partitions and with unique labels for topics of the streams. The default partition number can be one and can be manually increased or in automatic response to tracking throughput of the streams with respect to partitions. Efficient use of physical and virtual infrastructure can be attained. Such efficiency may be realized through dynamic lazy increase of partitions based on incoming event stream load (throughput). A lazy increase is an approach in which creation of an entire new partition is postponed until enough streaming elements are input, at least to some selected capacity and/or throughput criteria. An offload engine or coupled instrumentality can be provide logic to track input throughput and output throughput peaks, and resize partition count based on captured peak values and differences between a set maximum throughput and a tracked moving throughput. Tracking and resizing can be conducted using heuristics and close loop control.

Figure 11:
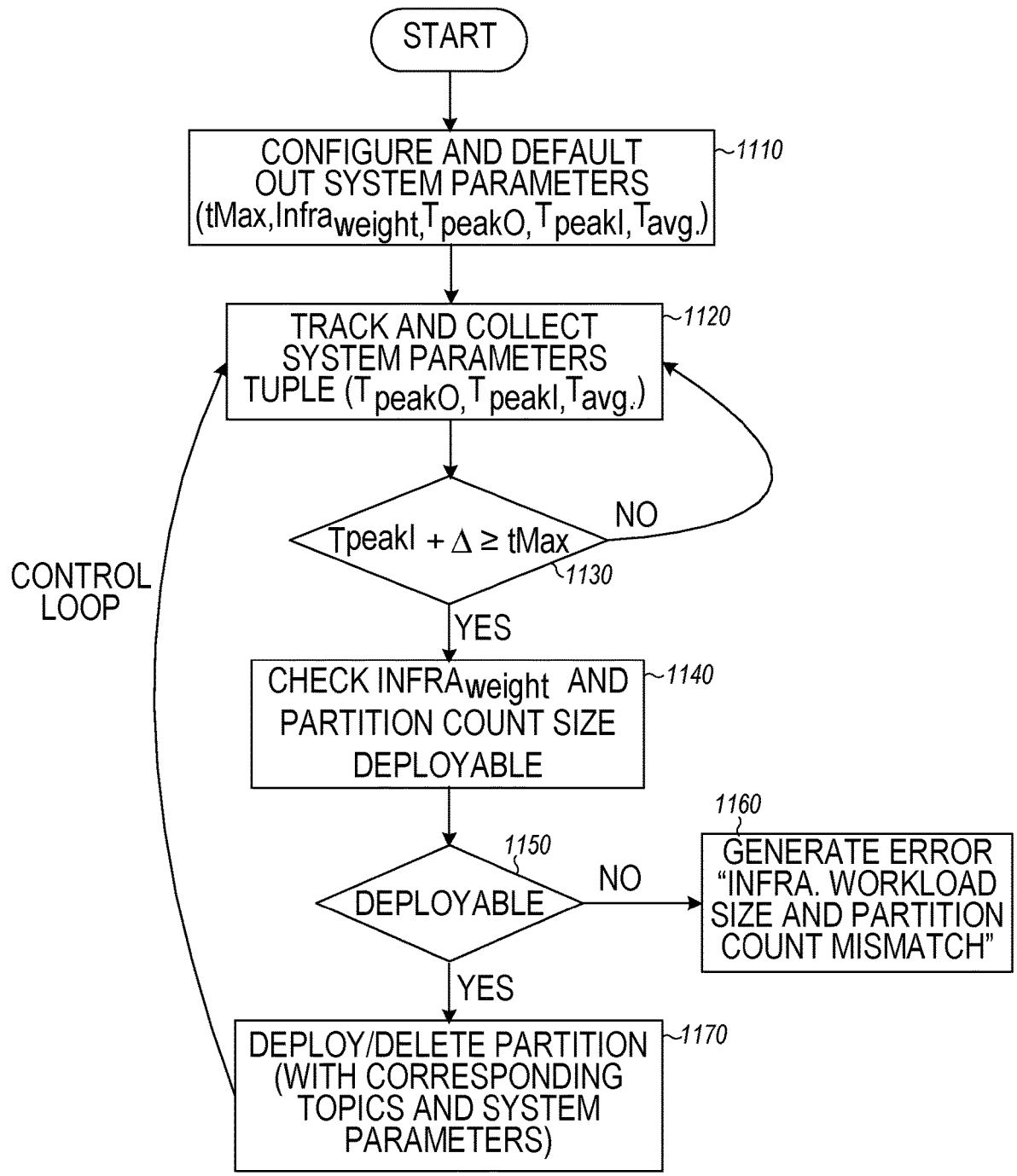
FIG. 11 is a flow diagram of example logic for partition rebalances, according to an example embodiment.

FIG. 11 is a flow diagram of an example of an embodiment of logic for partition rebalances. At 1110, system parameters are configured with defaults set. The system parameters can include a calculated workload weight (Infra$_{weight}$) for associated CPU, memory, and/or network input/output (I/O), peak throughput of output ($T_{peakO}$), peak throughput of input ($T_{peakI}$) average throughput of output ($T_{avg}$), and maximum ceiling throughput (tMax) that equals the desired maximum throughput. At 1120, system parameters are tracked and collected. These system parameters may be provided as tuples, such as ($T_{peakO}$, $T_{peakI}$, $T_{avg}$). At 1130, a determination is made as to whether $T_{peakI}$ plus Δ is greater than or equal to tMax, where Δ is a critical delta difference between tMax and measured input throughput. If $T_{peakI}$ plus Δ is less than tMax, the logic flow returns to 1120 to track and collect system parameters. At 1140, if $T_{peakI}$ plus Δ is greater than or equal to tMax, deployability is checked with respect to $Infra_{weight}$ and partition count size. At 1150, a determination is made as to whether a partition is deployable. At 1160, if the determination is negative with respect to deployability, an error message is generated. The error message can be proved as "Workload size and partition count mismatch." At 1170, if the determination is positive with respect to deployability, a partition is deployed or deleted. In addition to the partition being deployed or deleted, the partition is deployed or deleted with corresponding topics and system parameters.

Figure 12:
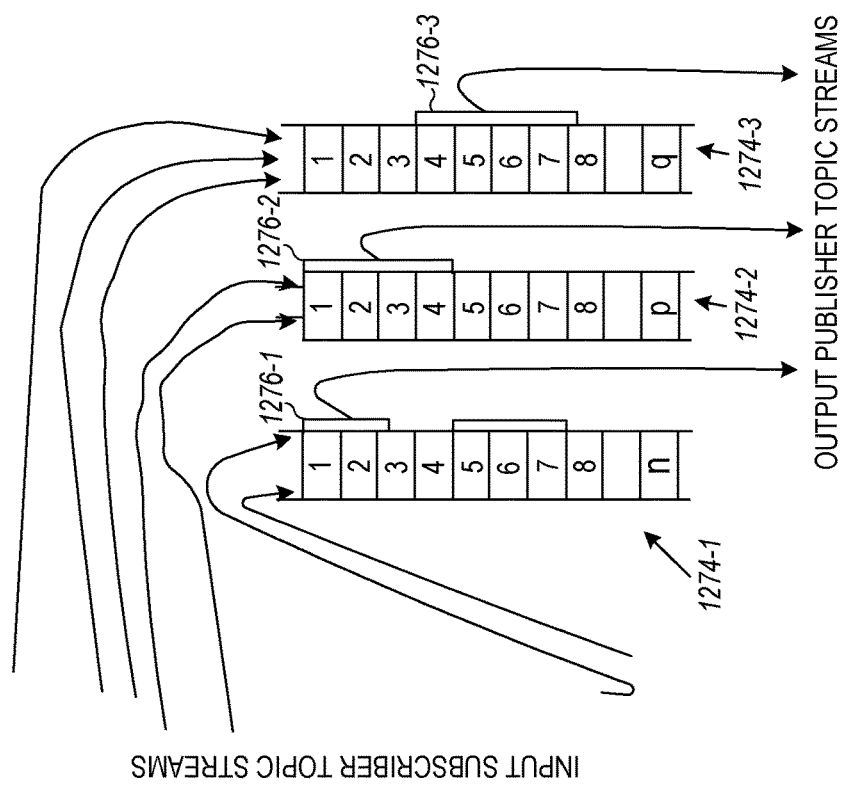
FIG. 12 is a schematic representation of an example partitions in a tracking of stream balancing, according to an example embodiment.

FIG. 12 is a schematic representation of an example of an embodiment of partitions in a tracking for stream balancing. In this example, input subscriber topic streams are directed into partitions 1274-1, 1274-2, and 1274-3. Partition 1274-1 has n allocated streams; partition 1274-2 has p allocated streams; and partition 1274-3 has q streams. Topic to partition placement can be balanced through round robin routing or an equal weight routing. Peak throughput in an out of the partitions can be tracked and used to dynamically rebalance the partitions. Elements of the logic of FIG. 11 can be used to rebalance the partitions. Publisher topic streams can be output in a selective manner Set 1276-1 of topic streams includes 3 streams being published from partition 1274-1. Set 1276-2 of topic streams includes 4 streams being published from partition 1274-2. Set 1276-3 of topic streams includes 5 streams being published from partition 1274-3.

Figure 13:
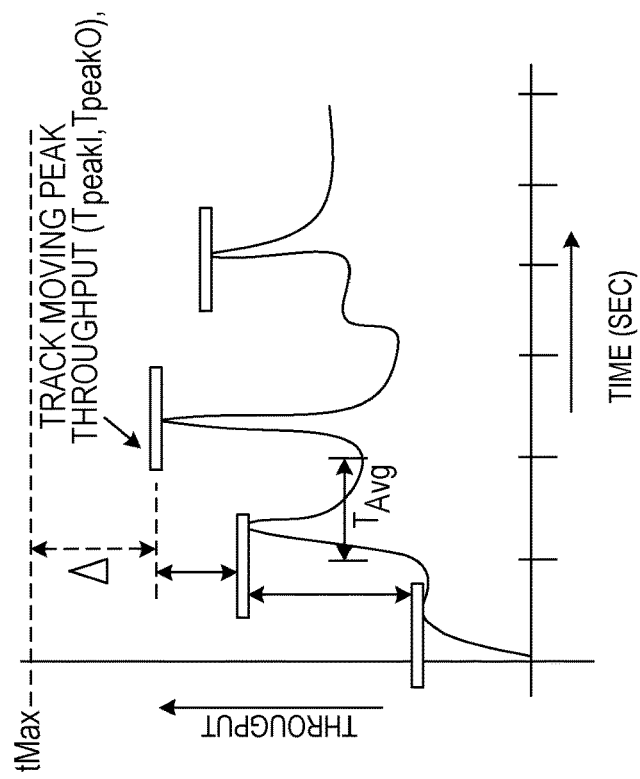
FIG. 13 is an example plot of throughput versus time that can be used to provide tracking and heuristic determination of partition balancing, according to an example embodiment.

FIG. 13 is an example plot of throughput versus time that can be used to provide tracking and heuristic determination of partition balancing. Sampling can be conducted over configurable intervals with peak collection potentially capturing microburst. A default sampling interval can be set. For example, the default sampling interval can be set to, but is not limited to, a 5 second interval. FIG. 13 shows the tracking of moving peak throughput ($T_{peakO}$, $T_{peakI}$) and the allocation of $T_{avg}$ along with a determination of Δ with respect to tMax.

Conventional controller architectures have a simplistic one component approach for event stream processing and all other SDN functionalities. This conventional approach is a wastage of infrastructure resources across a CPU, a network, and I/O utilized for event processing, as event handling and processing may consume all the resources. These event streams cannot be analyzed in real-time, which is a gap in event stream payload processing capability. Also, conventional controller architectures follow a centralized client server model. Various conventional approaches do not have a mechanism to handle reliability and stream processing across geo-distributed systems and/or have a centralized communication mode with no event processing offload support. Various conventional approaches do not provide support on unifying event stream communication, rather many specific adapters are created, and there is not intelligent processing of the event stream with payload inspection and strong typing support across SDN and IoT. Conventional controller/application component use dedicated connections for all data stream pushes. Conventional IoT approaches do not provide both a peer-to-peer architecture and intelligent processing capability of a payload. Applications like video currently have separate communication protocol.

Architectures, devices, and processes, as taught herein, can provide a mechanism for tracking specific metrics. From such metrics, a heuristic based algorithmic analysis can be performed. A continuous close loop control re-sizing feedback can be provided. Architectures, devices, and processes with an embedded payload mechanism, allows for all protocol streams, including video streams, to be transported and intelligently processed. Architectures, devices, and processes for an intelligent offload, dedicated event stream handling and processing engine may be provided to use peer-to-peer, publish-subscribe approaches. This can enable light controlling applications that can scale reliably in their specific sharded domains of influence and even grow beyond. Event stream intelligent processing through an offload engine, as taught herein, can provide scaling and attaining HA parameters. Unlike some conventional event stream approaches, approaches, as taught herein, are capable of becoming fine grain such that processing can be broken up or decoupled to provide granular load balanced scaling based on heuristics. Such heuristics can facilitate dynamic event stream handler resizing for efficiency and infrastructure utilization.

Figure 14:
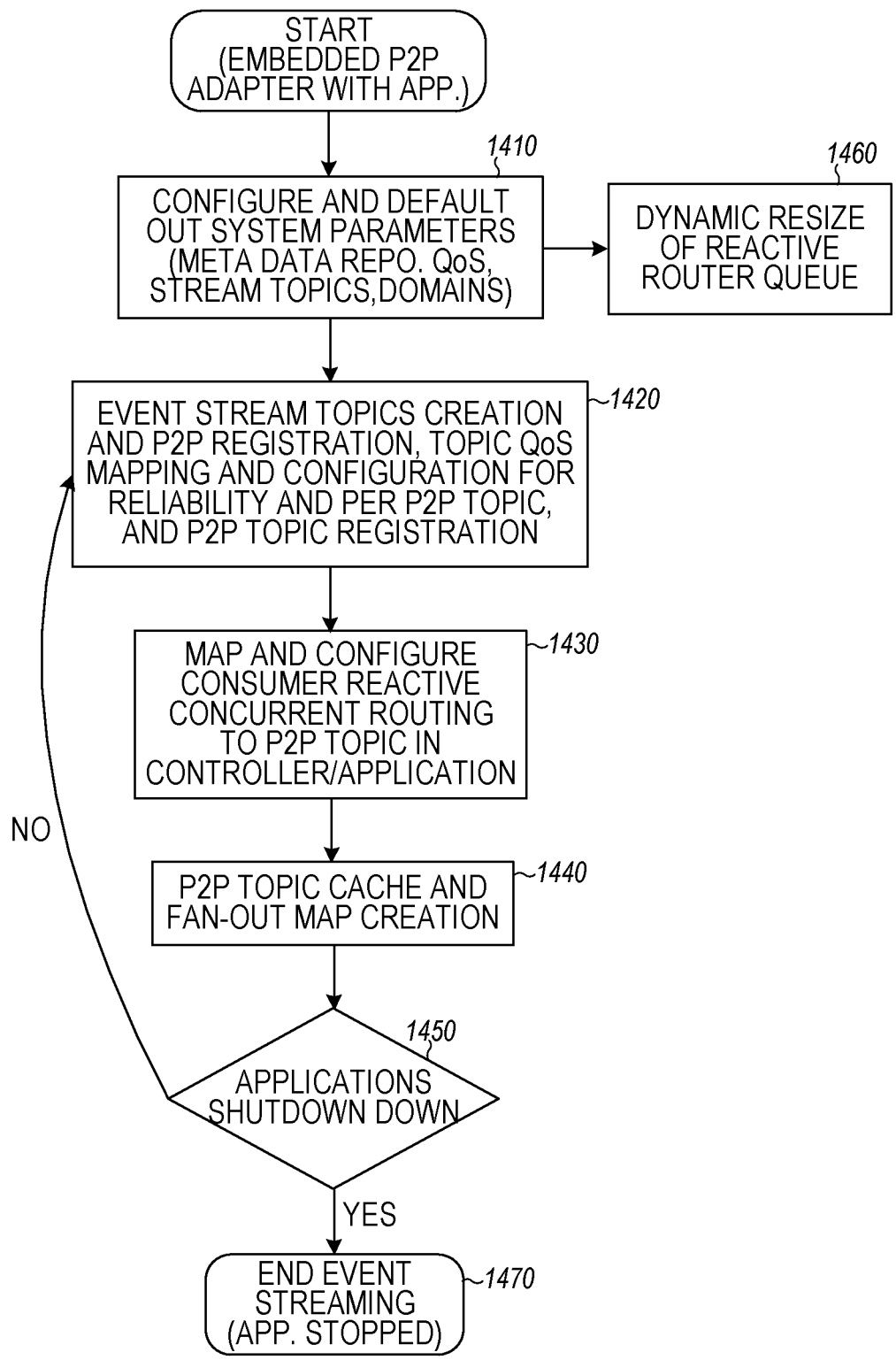
FIG. 14 is a flow diagram of features of an example reactive stream routing with cache and fan-out, according to an example embodiment.

FIG. 14 is a flow diagram of features of an example of an embodiment of reactive stream routing with cache and fan-out. At 1410, system parameters are configured and defaults are established. The configurations can include configurations for a metadata repository, QoS parameters, stream topics, and domains At 1420, event stream topics can be created and P2P registrations can be made. Topic QoS mapping and configuration can be implemented per P2P topic, where topic QoS mapping refers to associating quality of service to a topic. The association of QoS to a topic can provide a basis for providing reliability for the topic. The event stream topics, the association of QoS to topics, P2P topic registration, and other parameters can be stored in the metadata repository.

At 1430, an association (map) of consumer reactive concurrent routing to P2P topics in a controller/application can be created and configured. At 1440, a P2P topic is cached and a fan-out map is created, where the fan-out map is an association of topics to their respective destinations. At 1450, a determination is made as to whether the applications shutdown. If not, creation of event stream topics can continue from 1420 in the procedure. At 1460, logic can be implemented to conduct dynamic resizing of reactive router queues that bucket event streams. The queues can be viewed as buckets or containers in which event streams are held. At 1470, the event streaming is ended, which can be with the application stopping.

This reactive stream routing with cache and fan-out provides an reactive efficient event routing mechanism It facilitates an efficient, geo-distributed tiered scalable event streaming and processing interconnect. A reactive router operating to cache and fan-out can provide concurrent and highly available routing of event streams. The reactive router can be structured to provide dynamic resize of event queues of the reactive router, based on heuristics and control loop feedback. Event queues can be arranged as storage buckets of events. The reactive router can be structured to provide a means for interconnecting peers per event stream topic and payload, and for facilitating reliable stream flow across geo-distributed networks per QoS policies.

In the many-to-many interconnects of FIG. 3, a reactive router can be implemented to achieve reactive P2P interconnect 318-1 between controller/application 320-1 and controller/application 320-2 via embedded adapters 330-1 and 330-3, and reactive P2P interconnect 318-2 between controller/application 320-1 and controller/application 320-2 via embedded adapters 330-2 and 330-4. The reactive router may be operated with a data repository to affect the peer-to-peer activities.

A peer-to-peer interconnect can be implemented in hierarchical and tiered systems, providing purposeful processing at the desired locations (edge or core). The reactive router can would allow selective registration for data streams using a data depository as depicted in FIG. 8.

A reactive router can provide reactive and concurrent handling of received data event streams. The events stream received can be processed by reactive stream processor/s, which will concurrently handle the events, thus reducing the downstream/upstream event stream data processing. This reactive engine can interconnect with other peer applications for concurrent reactive processing to provide peer-to-peer entitled topic data stream interconnect. Similar to FIG. 10, each peer can register with a metadata repository, such as metadata repository 1070, for selectively subscribing and publishing, for example, as discussed with respect to FIG. 10.

Figure 15:
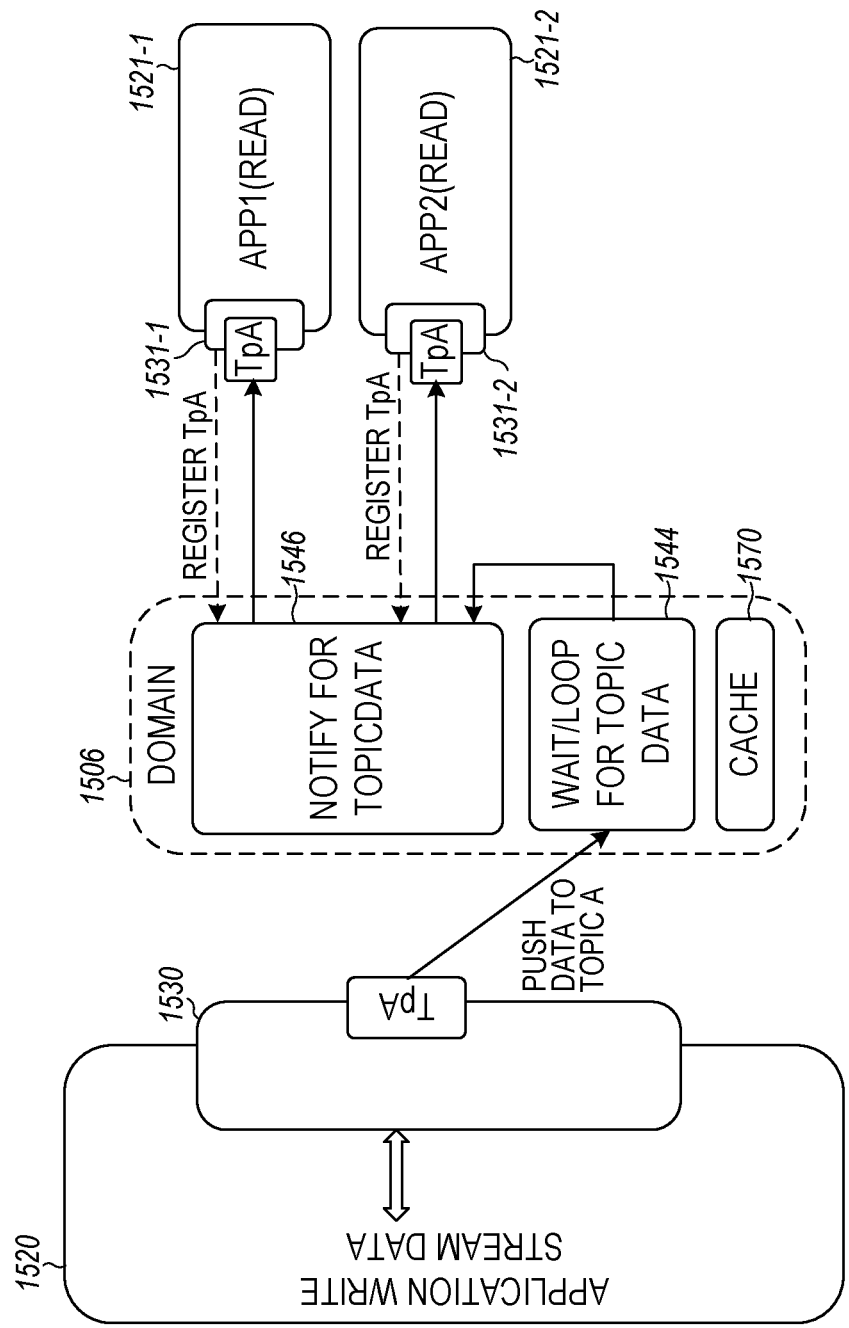
FIG. 15 illustrates a copy-cache once and a process to push a point-to-point publish/subscribe stream, according to an example embodiment.

FIG. 15 illustrates a copy-cache once and push a p2p publish/subscribe stream process. The push is a selective fan-out. This process can push everywhere per entitled publishers and listeners as a multicast. FIG. 15 shows a means for a controller/application 1520 to push topic data on a stream that is subscribed by peer applications 1521-1 and 1521-2, where upon the write to the cache, these peer applications get notified concurrently from the same cache. Controller/application 1520 uses an embedded adapter 1530 to communicate with domain 1506, which includes a cache 1570 that provides a P2P publish/subscribe metadata repository. Reader controller/applications 1521-1 and 1521-2 use embedded adapters 1531-1 and 1531-2 to communicate with domain 1506.

First, writer controller/application 1520 registers topic A associated with a registered identification of writer controller/application 1520. Second, reader controller/applications 1521-1 and 1521-2 register to domain 1506 for topic A, which is associated with a registered identifications for reader controller/applications 1521-1 and 1521-2. Domain 1506 includes a means 1544 for waiting or looping for topic data such as topic A and is coupled to a means 1546 for notifying for topic data, such as topic A. Means 1544 and 1546 may be realized by instructions and logic circuitry, which can include one or more processors, to monitor status of the topic data. Third, writer controller/application 1520 pushes data to stream topic A to cache 1570. Fourth, a selected multicast of topic A is performed to registered reader controller/applications 1521-1 and 1521-2.

The processes of selectively publishing and subscribing using cache once and push techniques can be enhanced with enabling flexibility of defining payload structure. Such flexibility can minimize translation processing downstream or upstream across heterogeneous legacy and emerging networks. A filter 913 can be used as shown in FIG. 9 and discussed above with respect to FIG. 9.

The reactive router can be dynamically controlled to have an evenly distributed load and to provide an optimal utilization of infrastructure resources. A means for dynamic resizing of reactive queues to enable serial, reactive, event stream processing in queue based containers (Fifo) can be implemented. The queues can have an upper bound for the number events, which can include messages. Each incoming stream (event) can be processed across distributed application clusters with adjustable upper maximum threshold in queues. The upper maximum bound can be configured manually, which may be a default, and updated dynamically for number of concurrent streams (events) based on heuristics data and close loop control feedback. The default can be set as tMax number of events and can be dynamically adjustable based on the difference between it and a moving input peak message count $T_{Ipeak}$.

Figure 16:
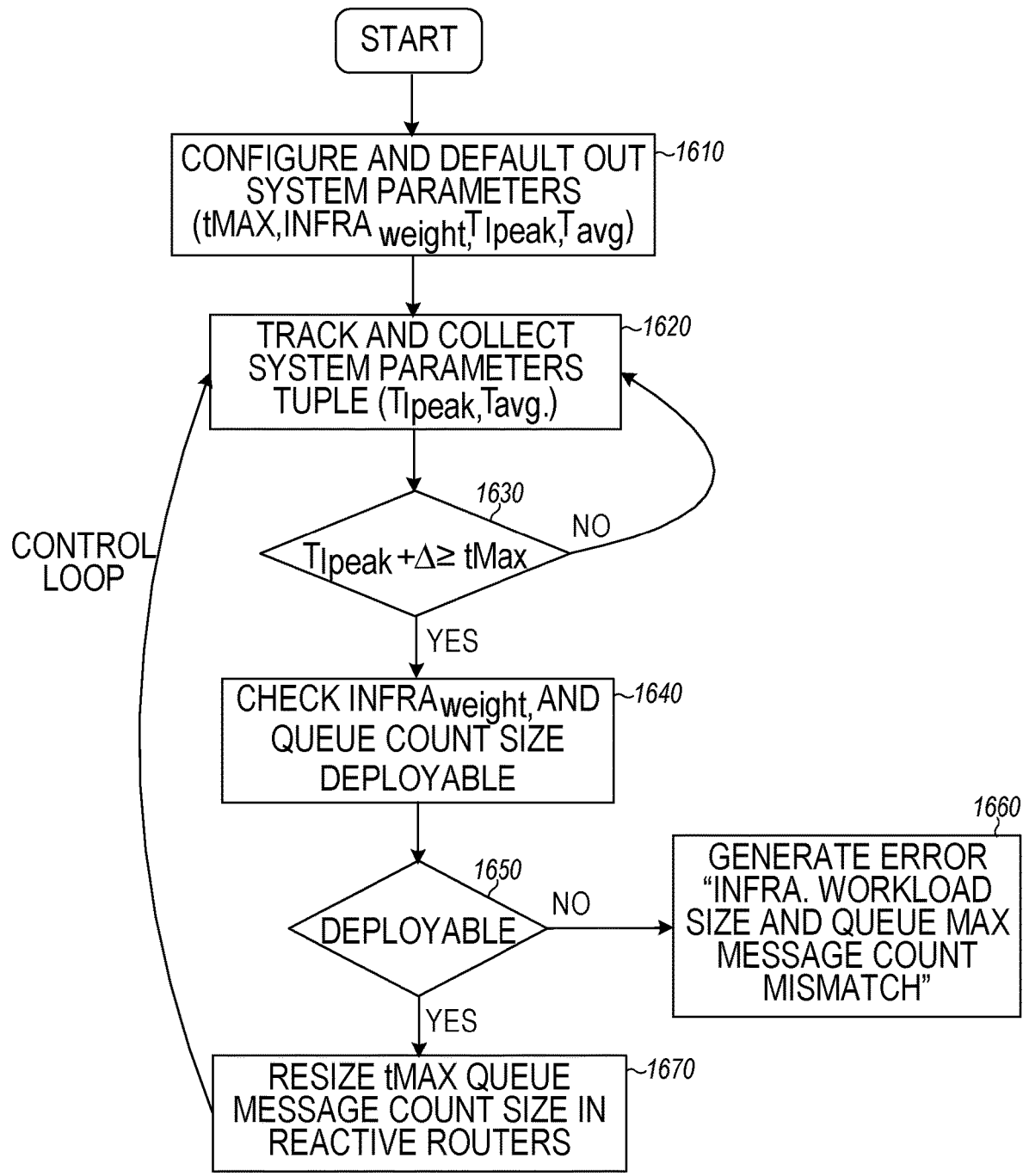
FIG. 16 illustrates an example of dynamic resize of reactive router queues, according to an example embodiment.

FIG. 16 illustrates an example of an embodiment of dynamic resize of reactive router queues that bucket event streams. At 1610, system parameters are configured with defaults set. The system parameters can include a calculated workload weight ($Infra_{weight}$) for associated CPU, memory, and/or network I/O, input peak message count throughput of output ($T_{Ipeak}$), average message count of baseline ($T_{avg}$), and maximum queue message size (tMax). At 1620, the system parameters are tracked and collected. These system parameters may be provided as tuples, such as ($T_{Ipeak}$, $T_{avg}$). At 1630, a determination is made as to whether $T_{Ipeak}$ plus Δ is greater than or equal to tMax, where Δ is a critical delta difference between tMax and measured queue input peak message count. If $T_{Ipeak}$ plus Δ is less than tMax, the logic flow returns to 1620 to track and collect system parameters. At 1640, if $T_{Ipeak}$ plus Δ is greater than or equal to tMax, deployability is checked with respect to $Infra_{weight}$ and queue count size. At 1650, a determination is made as to whether a queue is deployable. At 1660, if the determination is negative with respect to deployability, an error message is generated. The error message can be proved as "Infra workload size and queue max message count mismatch." At 1670, if the determination is positive with respect to deployability, tMax queue message count size in reactive routers are resized, and a control loop sends the process to 1620 to track and collect system parameters.

Figure 17:
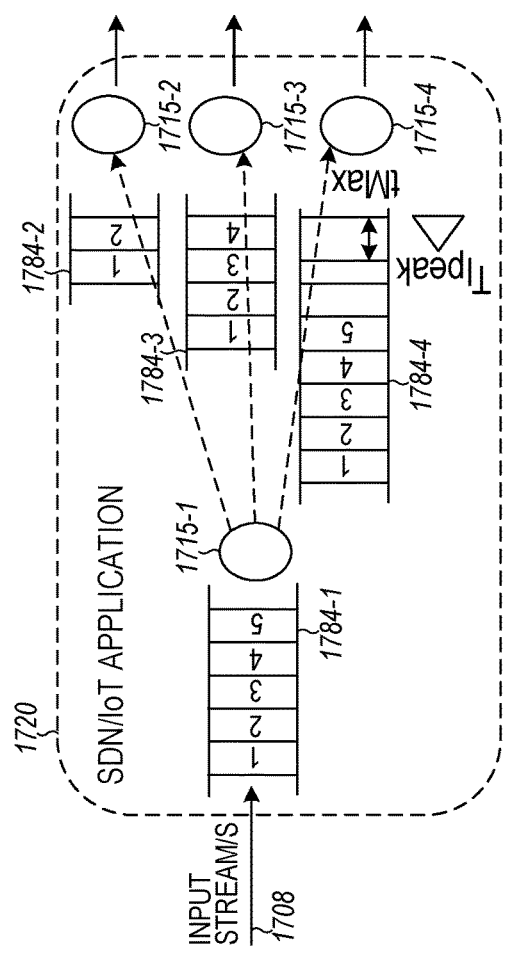
FIG. 17 is a schematic representation of an example of queues of streams in reactive routers of a SDN/IOT application, according to an example embodiment.

FIG. 17 is a schematic representation of an example of an embodiment of queues of streams in reactive routers of a SDN/IOT application 1720. Input streams 1708 enter queue 1784-1 to be directed by reactive stream router 1715-1. Reactive stream router 1715-1 directs the input streams 1708 into queues 1784-2, 1784-3, and 1784-4. Streams in queues 1784-2, 1784-3, and 1784-4 are distributed from SDN/IoT application 1720 by reactive stream routers 1715-2, 1715-3, and 1715-4, respectively. Parameters tMax and Δ for $T_{Ipeak}$ are shown for queue 1784-4. Stream placement can be balanced through round robin routing or an equal weight routing.

Figure 18:
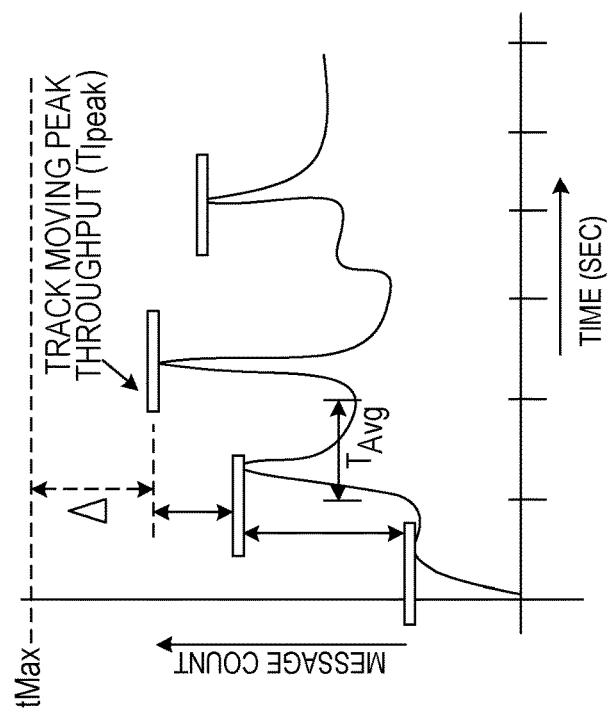
FIG. 18 is an example plot of message count versus time that can be used to provide dynamic queue resize heuristics, according to an example embodiment.

FIG. 18 is an example plot of message count versus time that can be used to provide dynamic queue resize heuristics. Sampling can be conducted over configurable intervals with peak collection potentially capturing microbursts. A default sampling interval can be set. For example, the default sampling interval can be set to, but is not limited to, a 5 second interval. FIG. 18 shows the tracking of moving peak throughput ($T_{Ipeak}$) and the allocation of $T_{avg}$ along with a determination of Δ with respect to tMax.

Unlike conventional approaches, using techniques as taught herein, events can be processed without being processed monolithically by a central processing entity and these techniques provide a natural capability to provide a fine-grain slice across tiers and hierarchical boundaries. In addition, such techniques can handle event streams opaquely and reactively.

Techniques, as taught herein, provide a mechanism of tracking specific metrics, performing a heuristic based unique algorithm analysis, and providing a continuous close loop control re-sizing feedback. Further, unlike conventional approaches, techniques, as taught herein, provide both a peer-to-peer, and a solution that provides intelligent processing capability of the payload. In addition, the embedded payload mechanism of various embodiments allows for all protocol streams including video streams to be transported, intelligently routed and processed. Rather than a client-server with redundant copying every time for a push mechanism, techniques as taught herein allow for a copy/cache and multicast mechanism is more efficient.

In contrast to conventional techniques, the reactive approaches, as taught herein, provide intelligent topic based fine grained event stream offload that allows downstream SDN/IoT applications to perform its pure function. These reactive approaches allow SDN/IoT networks to be tiered and segmented/sharded allowing for light controlling applications for distribution of functionality A network can be divided, which can enable localized fault handling and functional ownership. These reactive approaches can allow assimilation of current and legacy communication/protocols through common event streaming mechanism through embedded payload support. These reactive approaches allow efficiency in event stream processing will allow for fine-grain handling of SDN and IoT traffic, reducing chatter and duplication, thus enabling predictable networks.

In various embodiments, P2P communication is used to facilitate loosely coupled, reliable, heterogeneous and efficient many-to-many geo-distributed communication for inter controller/applications, inter SDN Raft based controller/applications, network elements and for SDN controller leader election and data communication Enhancing a Raft based SDN controller to use P2P communication allows for rich event processing geo-distributed tiered scalable event streaming and interconnect. A Raft controller is a controller that implements Raft, which is a consensus algorithm designed to distribute a computation model for interacting across a group of computing and networking systems, ensuring that each node in the group agrees upon the same series of state transitions. Consensus is attained using an elected leader. For example, a server in a Raft group is either a leader, a candidate, or a follower. The leader is responsible for log replication to the followers.

Figure 19:
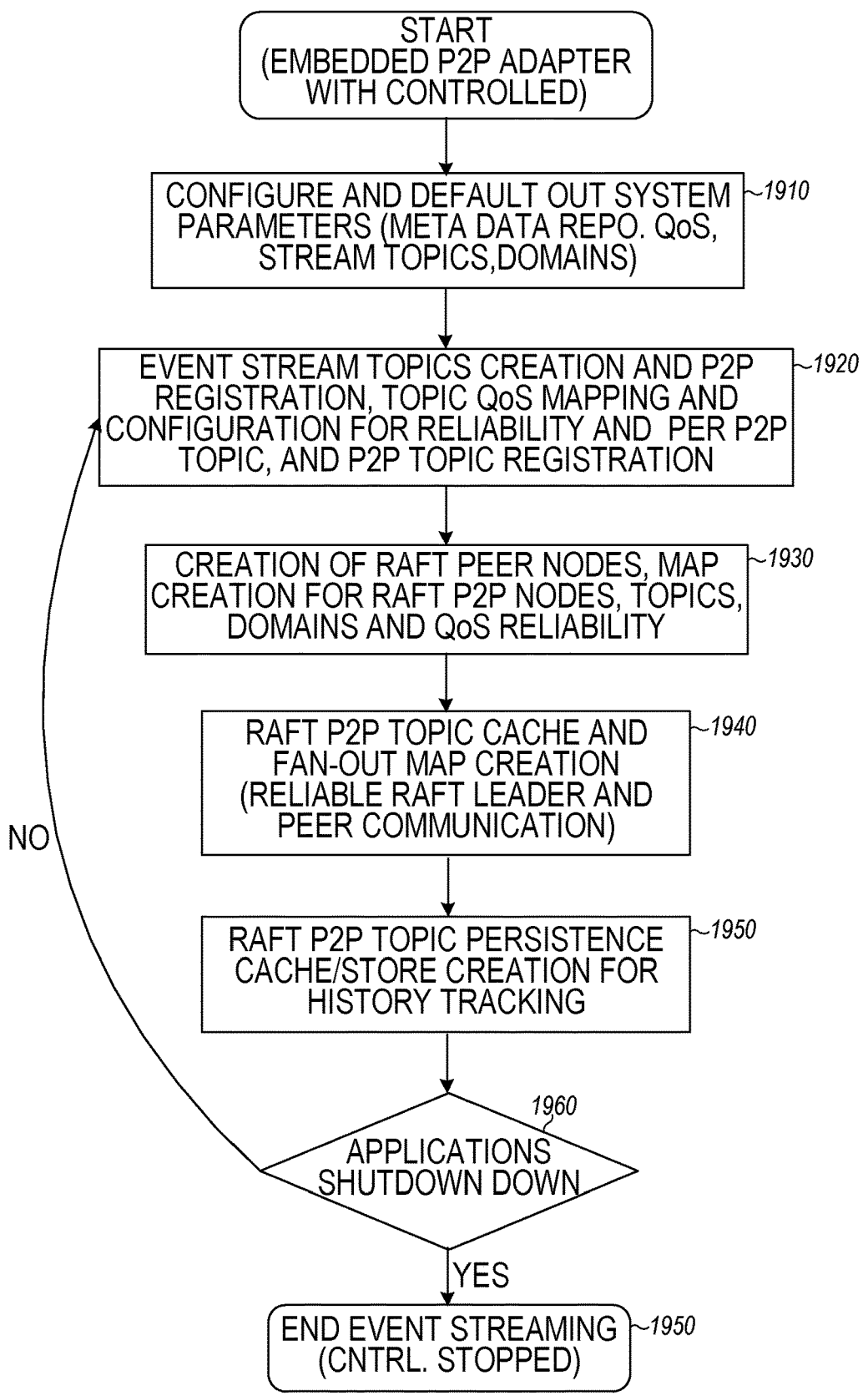
FIG. 19 is a flow diagram of features of an example of SDN controller leader election and data communication, according to an example embodiment.

FIG. 19 is a flow diagram of features of an example of an embodiment of SDN controller leader election and data communication. At 1910, system parameters are configured and defaults are established. The configurations can include configurations for a metadata repository, QoS parameters, stream topics, and domains At 1920, event stream topics can be created and P2P registrations can be made. QoS to topic mapping and configuration can be implemented for reliability and can be implemented per P2P topic, where QoS to topic mapping refers to associating quality of service to a topic. Operation using parameters for QoS for a topic provides a basis for implementing reliability for the topic. Event stream topics, QoS to topic mapping, and P2P topic registrations can be stored in the metadata repository. At 1930, Raft peer nodes are created, and an association (mapping) of topics, domains, and QoS reliability for RAFT P2P nodes is created. Raft peer nodes creation includes identification of nodes as Raft peer nodes. At 1640, a Raft P2P topic cache is created and fan-out map is created for reliable Raft leader and peer communication. At 1650, a Raft P2P topic persistence cache/store is created for history tracking. At 1660, a determination is made as to whether the applications shutdown. If not, creation of event stream topics can continue from 1620 in the procedure. At 1670, event streaming is ended, which can occur with the controller stopping.

Providing such a modification allows a Raft based SDN controller to become efficient and reliable with fine tunable configuration for peer node communication, allowing flexibility in SDN network scaling. FIG. 3 illustrates application of this modification as a copycat RAFT controller 390-1 in controller/application 320-1 and a copycat RAFT controller 390-2 in controller/application 320-2, where these Raft controllers can conduct copy-cache and fan-out operations. This approach allows SDN networks to be sharded selectively and the same time incorporate heterogeneous peers. This approach also allows Raft based SDN controllers to multicast rather than wasting resources on dedicated communication streams for every peer node connection. In addition, this approach allows for a reliable P2P publish/subscribe optimal cached once and push mechanism for SDN/IoT controller/application frameworks rather than a client-server based event communication for leadership election.

Figure 20:
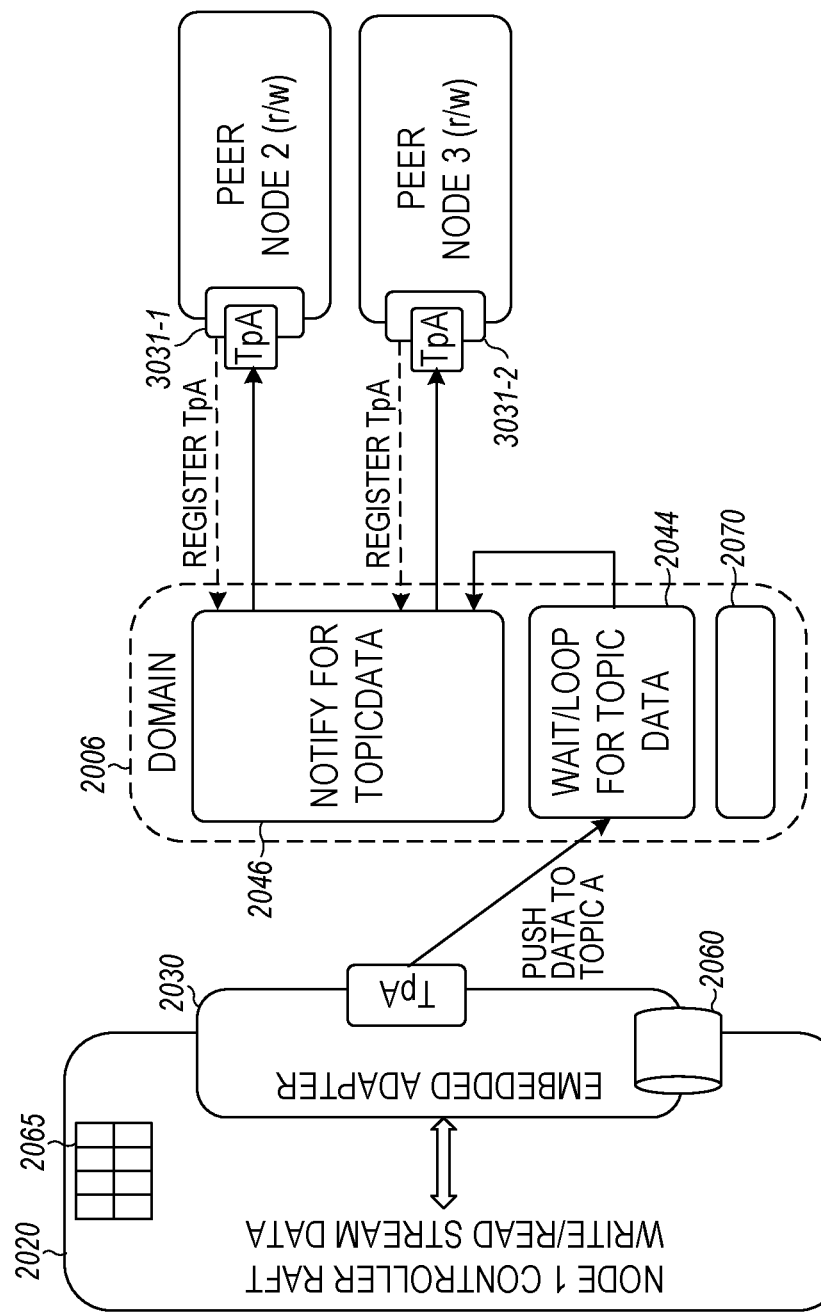
FIG. 20 illustrates an example SDN controller raft leader to peer copy-cache once and push P2P publish/subscribe stream interconnect, according to an example embodiment.

FIG. 20 illustrates an example of an embodiment of SDN controller raft leader to peer copy-cache once and push P2P publish/subscribe stream interconnect. The push is a selective fan-out of data to selected peer nodes. FIG. 20 shows a Raft controller 2020 for write/read (w/r) stream data at node 1. Raft controller 2020 includes storage 2065 of mappings including, but not limited to, associations among Raft peer topics, QoS, and persistence parameters. Raft 2020 also includes an embedded adapter 2030 coupled with a persistent topic history store 2060. From embedded adapter 2030, Raft controller 2020 can push data of topic A to a domain 2006. Domain 2006 includes a data repository 2070 that can cache data streams and P2P publish/subscribe metadata. Associated with node 1 are peer node 2 for read and write (r/w) and peer node 3 for r/w. Nodes 2 and 3 include embedded adapters 3031-1 and 3031-2 to communicate with domain 2006.

First, Raft controller 2020 registers topic A associated with a registered identification of Raft controller 2020 to domain 2006. Second, reader nodes 2 and 3 register to domain 2006 for topic A, which is associated with registered identifications for nodes 2 and 3. Domain 2006 includes a means 2044 for waiting or looping for topic data such as topic A and is coupled to a means 2046 for notifying for topic data, such as topic A. Means 2044 and 2046 may be realized by instructions and logic circuitry, which can include one or more processors, to monitor status of the topic data. Third, Raft controller 2020 pushes data to stream topic A to domain 2006. Fourth, a selected multicast of topic A is performed to registered nodes 2 and 3.

Cache once and push from peer SDN Controller Node publishers to entitled peer controller node listeners and vice versa as depicted in FIG. 20 can utilize registered topics/labels across a domain for pushing event data to peers in sharded SDN networks across N-S and E-W tiers as depicted in FIG. 8. The structure of FIG. 20 can also enable historical tracking of pushed data reliably through a durable data cache as depicted in FIG. 7. The implementation taught in FIG. 20 can enable conventional SDN controller based networks to be selectively peered by functionality and location through peer to peer listener/publisher node registration scheme as depicted in FIG. 10.

Architectures implementing the features associated with FIGS. 19-20 can facilitate routing of "consistent data" event stream to cluster peer controller applications with QoS reliability and with fine grained control through filter policies as depicted in FIG. 7. In addition, such architectures can facilitate accommodation of heterogeneous SDN controller/applications by facilitating opaque handling of header and payload for transported event stream data as depicted in FIG. 9. Further, such architectures can enable flexibility of defining payload structure, thus minimizing translation processing downstream or upstream across heterogeneous SDN controllers and emerging networks.

Figure 21:
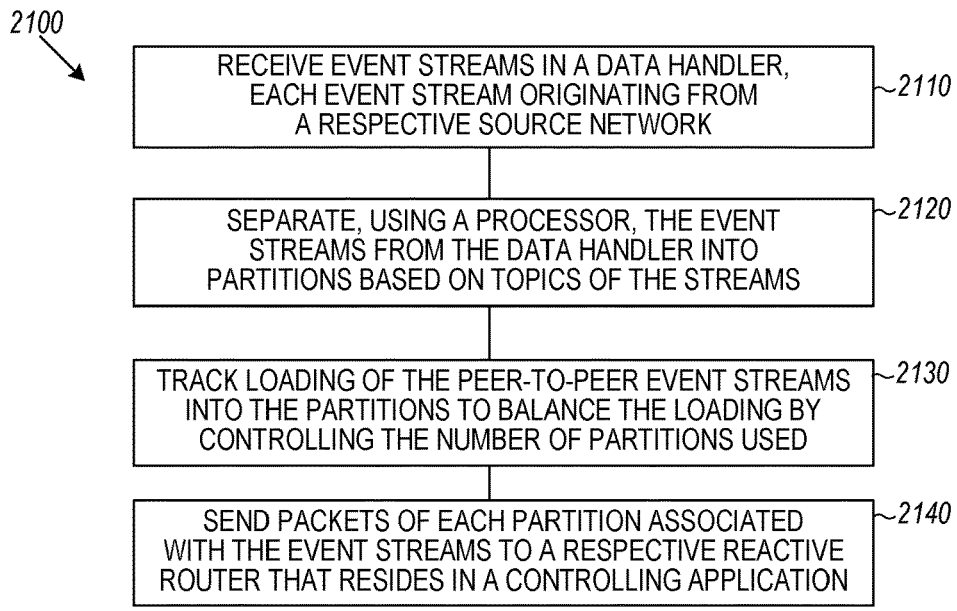
FIG. 21 is a flow diagram of features of an example method of handling peer-to-peer streams, according to an example embodiment.

FIG. 21 is a flow diagram of features of an embodiment of an example computer-implemented method 2100 of handling events streams. At 2110, event streams are received in a data handler, each event stream originating from a respective source network. The event streams can be peer-to-peer event streams. At 2120, the event streams are separated, using a processor, from the data handler into partitions based on topics of the streams. At 2130, loading of the event streams into the partitions is tracked to balance the loading by controlling the number of partitions used. At 2140, packets of each partition, associated with the event streams, are sent to a respective reactive router that resides in a controlling application.

Method 2100 or methods similar to or identical to method 2100 can include tracking the loading of the event streams by tracking input throughput peaks and output throughput peaks of the partitions, and resizing partition count based on captured peak values and differences with respect to a maximum throughput using heuristics and close loop control. The differences with respect to a maximum throughput can be differences between a maximum ceiling throughput and measured input throughput.

Variations of method 2100 or methods similar to method 2100 can include a number of different embodiments that may or may not be combined depending on the application of such methods and/or the architecture of systems in which such methods are implemented. Such methods can include examining, by the respective reactive router, a payload of each packet and determining a module of the controlling application to process the packet based on the examination; and inserting, by the reactive router, each packet into an input queue of the determined module. Such methods can include creating one or more additional queues, by the respective reactive router, when one or more input queues of modules of the controlling application become unbalanced. Variations can include re-directing packets, by the respective reactive router, using a payload filter policy that includes a quality of service parameter and peer information. Variations of method 2100 or methods similar to method 2100 can include the respective reactive router selectively distributing individual packets to software defined network (SDN) and/or Internet of things (IoT) network nodes using a cache that maintains registration of the SDN and/or IoT network nodes based on domains.

A device can be arranged to perform method 2100 or methods similar to or identical to method 2100 along with other functions. A device can comprise a memory storage, comprising instructions, and one or more processors in communication with the memory storage, wherein the one or more processors execute the instructions to perform operations related to functions of handling event streams. The operations can comprise receiving event streams in a data handler, each event stream originating from a respective source network, and separating the event streams from the data handler into partitions based on topics of the streams. The event streams can be peer-to-peer event streams. The operations can include tracking the loading of the event streams into the partitions to balance the loading by controlling the number of partitions used. Packets of each partition, associated with the event streams, can be sent to a respective reactive router that resides in a controlling application.

Operations executed by the one or more processors of the device can include tracking input throughput peaks and output throughput peaks of the partitions, and resizing partition count based on captured peak values and differences with respect to a maximum throughput using heuristics and close loop control. The differences with respect to a maximum throughput can be differences between a maximum ceiling throughput and measured input throughput.

The operations executed by the one or more processors can include examining, by the respective reactive router, a payload of each packet and determining a module of the controlling application to process the packet based on the examination. Operations can also include inserting, by the respective reactive router, each packet into an input queue of the determined module. The operations can include creating one or more additional queues, by the respective reactive router, when one or more input queues of modules of the controlling application become unbalanced.

The operations executed by the one or more processors can include re-directing packets, by the respective reactive router, using a payload filter policy that includes a quality of service parameter and peer information. The operations executed by the one or more processors can include the respective reactive router selectively distributing individual packets to software defined network (SDN) and/or Internet of things (IoT) network nodes using a cache that maintains registration of the SDN and/or IoT network nodes based on domains.

In various embodiments, a non-transitory machine-readable storage device, such as computer-readable non-transitory media, can comprise instructions stored thereon, which, when performed by a machine, cause the machine to perform operations, where the operations comprise one or more features similar to or identical to features of methods and techniques described with respect to method 2100, variations thereof, and/or features of other methods taught herein such as associated with FIGS. 1-24. The physical structures of such instructions may be operated on by one or more processors. For example, executing these physical structures can cause the machine to perform operations comprising: receiving event streams in a data handler, each event stream originating from a respective source network; separating the event streams from the data handler into partitions based on topics of the streams; tracking loading of the event streams into the partitions to balance the loading by controlling the number of partitions used; and sending packets of each partition, associated with the event streams, to a respective reactive router that resides in a controlling application. The event streams can be peer-to-peer event streams.

The instructions can include a number of operations. The operations can include the tracking of the loading of the event streams to include tracking input throughput peaks and output throughput peaks of the partitions, and resizing partition count based on captured peak values and differences with respect to a maximum throughput using heuristics and close loop control. The operations can include examining, by the respective reactive router, a payload of each packet and determining a module of the controlling application to process the packet based on the examination; and inserting, by the reactive router, each packet into an input queue of the determined module. The operations can include creating one or more additional queues, by the respective reactive router, when one or more input queues of modules of the controlling application become unbalanced.

The operations can include re-directing packets, by the respective reactive router, using a payload filter policy that includes a quality of service parameter and peer information. The operations can include the respective reactive router selectively distributing individual packets to software defined network (SDN) and/or Internet of things (IoT) network nodes using a cache that maintains registration of the SDN and/or IoT network nodes based on domains Further, machine-readable storage devices, such as computer-readable non-transitory media, herein, are physical devices that stores data represented by physical structure within the respective device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory storage 2403 of FIG. 24. While memory storage 2403 is shown as a multiple component unit, terms such as "memory," "memory module," "machine-readable medium," " machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a " machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 22:
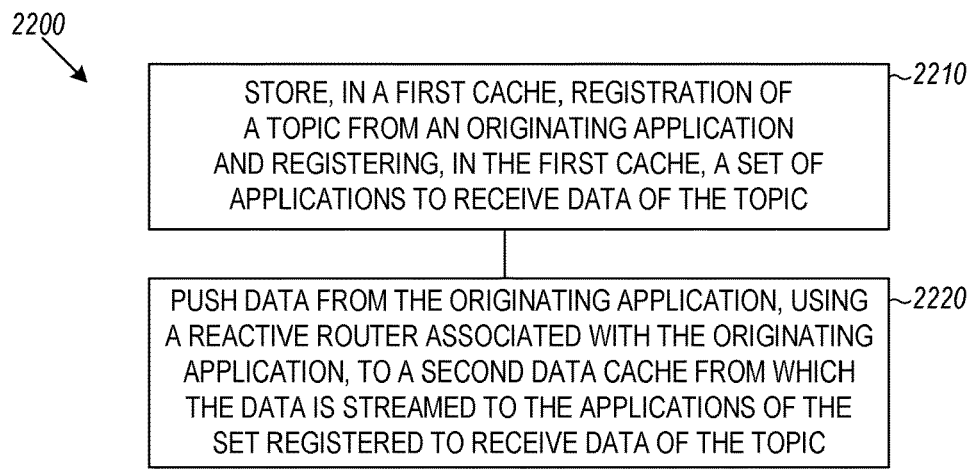
FIG. 22 is a flow diagram of features of an example method of handling peer-to-peer streams, according to an example embodiment.

FIG. 22 is a flow diagram of features of an embodiment of an example method 2200 of handling event streams. At 2210, registration of a topic from an originating application is stored in a first cache, and a set of applications to receive data of the topic is registered in the first cache. At 2220, data from the originating application is pushed, using a reactive router associated with the originating application, to a second data cache from which the data is streamed to the applications of the set registered to receive data of the topic. The first cache and the second cache can be realized a common cache.

Method 2200 or methods similar or identical to method 2200 can include storing historical tracking data regarding the data pushed from the originating application. Such methods can include redefining a payload structure of the data, using the reactive router. Such methods can include maintaining, in a metadata repository, a payload filter policy to redefine the payload structure. The payload filter policy can include a quality of service parameter and peer information.

Method 2200 or methods similar or identical to method 2200 can include dynamically resizing queues that bucket events, using the reactive router, in which each incoming stream of events is processed with respect to an adjustable upper maximum threshold in each queue, the upper maximum threshold updated dynamically for a number of concurrent stream events based on heuristics data and close loop control feedback.

A device can be arranged to perform method 2200 or methods similar to or identical to method 2200 and may be arranged to perform other functions such as, but not limited to, functions associated with methods 2100 and 2300. A device can comprise a memory storage, comprising instructions, and one or more processors in communication with the memory, wherein the one or more processors execute the instructions to perform operations related to method 2200 or variations thereof. A device can comprise a first cache to store registration of a topic from an originating application and to register a set of applications to receive data of the topic; a second cache to store data of the topic from the originating application; a reactive router associated with the originating application and arranged to operatively push the data from the originating application to the second data cache from which the data is streamed to the application of the set registered to receive data of the topic; and one or more processors to execute functions of the first cache, the second cache, and the reactive router.

The device can include a durable data cache to store historical tracking data regarding the data pushed from the originating application. The device can include access to a metadata repository that maintains a payload filter policy to redefine the payload structure. The payload filter policy includes a quality of service parameter and peer information.

The reactive router can be structured to operate to redefine a payload structure of the data. The reactive router can be structured to operate to dynamically resize queues that bucket events, in which each incoming stream of events is processed with respect to an adjustable upper maximum threshold in each queue, the upper maximum threshold updated dynamically for a number of concurrent streams based on heuristics data and close loop control feedback.

In various embodiments, a non-transitory machine-readable storage device can comprise instructions stored thereon, which, when performed by a machine, cause the machine to perform operations, the operations comprising one or more features similar to or identical to features of methods and techniques described with respect to method 2200, variations thereof, and/or features of other methods taught herein such as associated with FIGS. 1-24. The physical structures of such instructions may be operated on by one or more processors. For example, executing these physical structures can cause the machine to perform operations comprising: storing, in a first cache, registration of a topic from an originating application and registering, in the first cache, a set of applications to receive data of the topic; and pushing data from the originating application, using a reactive router associated with the originating application, to a second data cache from which the data is streamed to the applications of the set registered to receive data of the topic.

The instructions can include a number of operations. The instructions can include storing historical tracking data regarding the data pushed from the originating application. The instructions can include redefining a payload structure of the data, using the reactive router. The instructions can include maintaining, in a metadata repository, a payload filter policy to redefine the payload structure. The payload filter policy can include a quality of service parameter and peer information. The instructions can include dynamically resizing queues that bucket events, using the reactive router, in which each incoming stream of events is processed with respect to an adjustable upper maximum threshold in each queue, the upper maximum threshold updated dynamically for a number of concurrent streams based on heuristics data and close loop control feedback.

Figure 23:
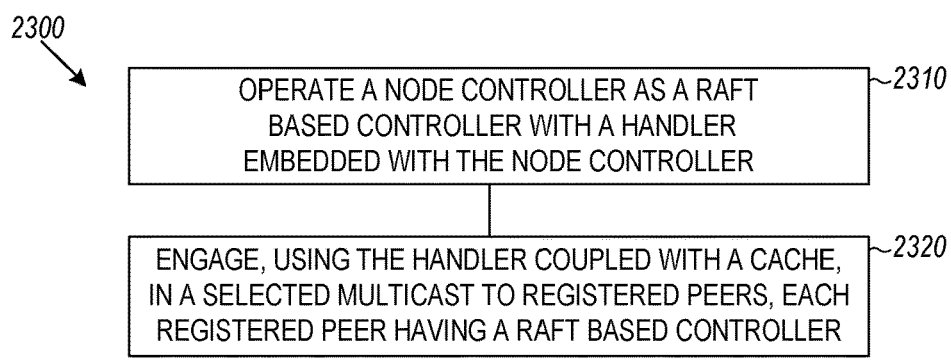
FIG. 23 is a flow diagram of features of an example method of selective multicasting to a set of registered peers, according to an example embodiment.

FIG. 23 is a flow diagram of features of an embodiment of an example method 2300 of selective multicasting to a set of registered peers. At 2310, a node controller is operated as a Raft based controller with a handler embedded with the node controller. At 2320, a selected multicast to registered peers is engaged using the handler coupled with a cache, where each registered peer has a Raft based controller. The cache can include a repository of metadata of stream topics and registration of the registered peers. Method 2300 or methods similar to or identical to method 2300 can include implementing the node controller as an elected leader of the registered peers based on mapping of RAFT peer to peer nodes of a group including the controller and the registered peers, topics, quality of service parameters, and peer information maintained in the cache.

A device can be arranged to perform method 2300 or methods similar to or identical to method 2300 and may be arranged to perform other functions such as, but not limited to, functions associated with methods 2100 and 2200. A device can comprise a memory storage, comprising instructions, and one or more processors in communication with the memory storage, wherein the one or more processors execute the instructions to perform operations related to method 2300 or variations thereof. A device can comprise a node controller operable as a Raft based controller; a handler embedded with the node controller; a cache operatively coupled to the handler to engage in a selected multicast to registered peers, each registered peer having a Raft based controller; and one or more processors to execute functions of the node controller, the handler, and the cache. The cache can include a repository of metadata of stream topics and registration of the registered peers. The Raft based controller can be an elected leader of the registered peers based on mapping of RAFT peer to peer nodes of a group including the controller and the registered peers, topics, quality of service parameters, and peer information maintained in the cache.

In various embodiments, a non-transitory machine-readable storage device can comprise instructions stored thereon, which, when performed by a machine, cause the machine to perform operations, the operations comprising one or more features similar to or identical to features of methods and techniques described with respect to method 2300, variations thereof, and/or features of other methods taught herein such as associated with FIGS. 1-24. The physical structures of such instructions may be operated on by one or more processors. For example, executing these physical structures can cause the machine to perform operations comprising: operating a node controller as a Raft based controller with a handler embedded with the node controller; and engaging, using the handler coupled with a cache, in a selected multicast to registered peers, each registered peer having a Raft based controller.

The instructions can include a number of operations. The instructions can include using the handler coupled with the cache to include the cache having a repository of metadata of stream topics and registration of the registered peers. The instructions can include implementing the node controller as an elected leader of the registered peers based on mapping of RAFT peer to peer nodes of a group including the controller and the registered peers, topics, quality of service parameters, and peer information maintained in the cache.

Figure 24:
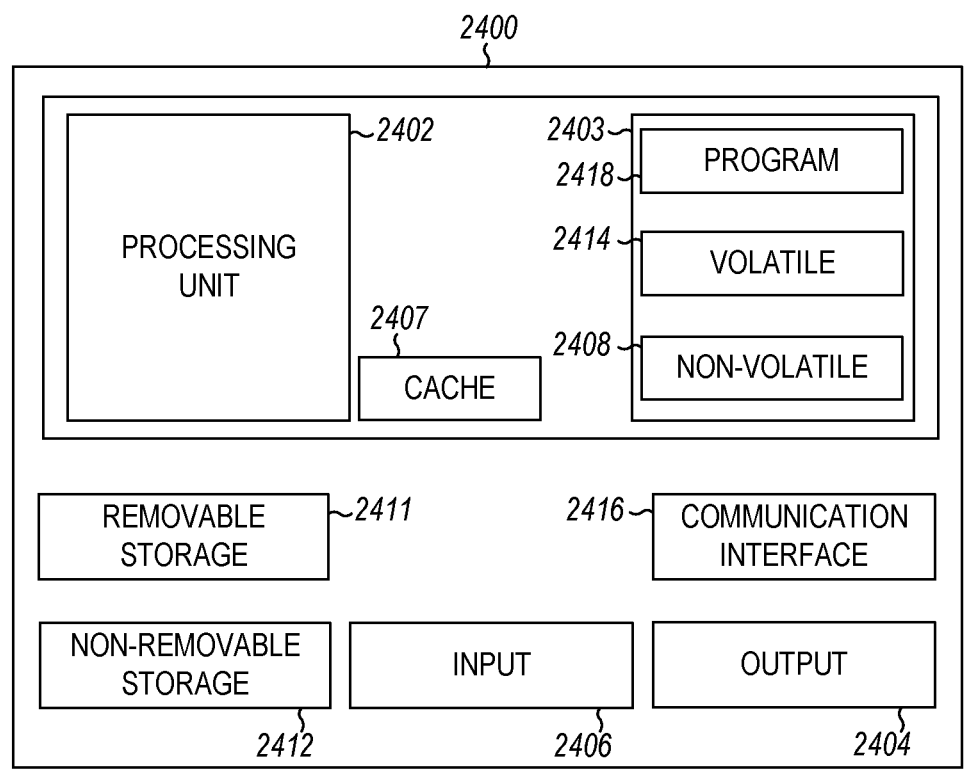
FIG. 24 is a block diagram illustrating circuitry for resources for implementing algorithms and performing methods, according to example embodiments.

FIG. 24 is a block diagram illustrating circuitry for devices for implementing algorithms and performing methods of conducting event processing offload that facilitates an efficient, geo-distributed tiered scalable event streaming, according to the teachings herein. FIG. 24 depicts a device 2400 having a non-transitory memory storage 2403 storing instructions, a cache 2407, and a processing unit 2402. Processing unit 2402 can include one or more processors operatively in communication with non-transitory memory storage 2403 and cache 2407. The one or more processors can be structured to execute the instructions to operate device 2400 according to any of the methods taught herein. The one or more processors can be structured to execute the instructions to operate device 2400 within a tiered SDN/IoT network. The one or more processors can be structured to execute the instructions receive event streams, each event stream originating from a respective source network; separate the event streams into partitions based on topics of the streams; to track loading of the event streams into the partitions to balance the loading by controlling the number of partitions used; and to send packets of each partition, associated with the event streams, to a respective reactive router that resides in a controlling application. The event streams can be peer-to-peer event streams.

Device 2400 can include a communication interface 2416 operable to communicate among types of nodes of a SDN/IoT network. The communication interface 2416 may be part of an embedded adapter for a number of network devices and other devices as discussed herein. The communication interface 2416 may be part of a data bus that can be used to receive the event streams for processing by an event offload engine.

Non-transitory memory storage 2403 may be realized as machine-readable media, such as computer-readable media, and may include volatile memory 2414 and non-volatile memory 2408. Device 2400 may include or have access to a computing environment that includes a variety of machine-readable media including as computer-readable media, such as volatile memory 2414, non-volatile memory 2408, removable storage 2411, and non-removable storage 2412. Such machine-readable media may be used with instructions in one or more programs 2418 executed by device 2400. Cache 2407 may be realized as a separate memory component or part of one or more of volatile memory 2414, non-volatile memory 2408, removable storage 2411, or non-removable storage 2412. Memory storage can include random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Device 2400 may include or have access to a computing environment that includes input 2406 and output 2404. Output 2404 may include a display device, such as a touchscreen, that also may serve as an input device. The input 2406 may include one or more of a touchscreen, touchpad, mouse, keyboard, camera, one or more device-specific buttons, one or more sensors integrated within or coupled via wired or wireless data connections to device 2400, and other input devices. Device 2400 may operate in a networked environment using a communication connection to connect to one or more other devices that are remote. Such remote devices may be similar to device 2400 or may be different types of devices having features similar or identical to features of device 2400 or other features, as taught herein, to offload processing of event streams to separate out the handling stream processing that is separate from the primary functions of a SDN/IoT application. The remote devices may include computers, such as database servers. Such remote computers may include a personal computer (PC), server, router, network PC, a peer device or other common network node, or the like. The communication connection may include a Local Area Network (LAN), a Wide Area Network (WAN), cellular, WiFi, Bluetooth, or other networks.

Machine-readable instructions, such as computer-readable instructions stored on a computer-readable medium, are executable by the processing unit 2402 of the device 2400. A hard drive, CD-ROM, and RAM are some examples of articles including a non-transitory computer-readable medium such as a storage device. The terms machine-readable medium, computer-readable medium, and storage device do not include carrier waves to the extent carrier waves are deemed transitory. Storage can also include networked storage such as a storage area network (SAN).

In various embodiments, a non-transitory machine-readable storage device can comprise instructions stored thereon, which, when performed by a machine, cause the machine to perform operations to provide a means for operating an event offload engine with respect to P2P stream, which when executed by one or more processors of the machine, cause the one or more processors to perform operations comprising one or more features similar to or identical to features of methods and techniques taught herein, variations thereof, and/or features of other P2P processing as associated with FIGS. 1-24. The physical structures of such instructions may be operated on by one or more processors, such as one or more processors of processing unit 2403.

Device 2400 can be realized as a computing device that may be in different forms in different embodiments, as part of a network such as a SDN/IoT network. For example, device 2400 may be a smartphone, a tablet, smartwatch, other computing device, or other types of devices having wireless communication capabilities, where such devices include components to engage in the distribution and storage of items of content, as taught herein. Devices, such as smartphones, tablets, smartwatches, and other types of device having wireless communication capabilities, are generally collectively referred to as mobile devices or user equipment. In addition, some of these devices may be considered as systems for the functions and/or applications for which they are implemented. Further, although the various data storage elements are illustrated as part of the device 2400, the storage may also or alternatively include cloud-based storage accessible via a network, such as the Internet or server based storage.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A device operable to handle event streams for processing, comprising:
a memory storage comprising instructions; and
one or more processors in communication with the memory storage, wherein the one or more processors execute the instructions to perform operations comprising:
receiving event streams in a data handler, each event stream originating from a respective source network;
separating the event streams from the data handler into a number of partitions based on topics of the event streams;
tracking loading of the event streams into the number of partitions to balance the loading by controlling the number of partitions, wherein the tracking includes tracking input throughput peaks and output throughput peaks of the number of partitions;
resizing the number of partitions based on captured peak values and differences with respect to a maximum throughput using heuristics and close loop control; and
sending packets of each partition, associated with the event streams, to a respective reactive router that resides in a controlling application.

2. The device of claim 1, wherein the differences with respect to the maximum throughput are differences between a maximum ceiling throughput and measured input throughput.

3. The device of claim 1, wherein the operations include examining, by the respective reactive router, a payload of each packet and determining a module of the controlling application to process the packet based on the examination; and
inserting, by the respective reactive router, each packet into an input queue of the determined module.

4. The device of claim 3, wherein the operations include creating one or more additional queues, by the respective reactive router, when one or more input queues of modules of the controlling application become unbalanced.

5. The device of claim 3, wherein the operations include re-directing packets, by the respective reactive router, using a payload filter policy that includes a quality of service parameter and peer information.

6. The device of claim 3, wherein the operations include the respective reactive router selectively distributing individual packets to software defined network (SDN) and/or Internet of things (IoT) network nodes using a cache that maintains registration of the SDN and/or IoT network nodes based on domains.

7. A computer-implemented method comprising:
receiving event streams in a data handler, each event stream originating from a respective source network;
separating, using a processor, the event streams from the data handler into a number of partitions based on topics of the event streams;
tracking loading of the event streams into the number of partitions to balance the loading by controlling the number of partitions, wherein the tracking includes tracking input throughput peaks and output throughput peaks of the number of partitions;
resizing the number of partitions based on captured peak values and differences with respect to a maximum throughput using heuristics and close loop control; and
sending packets of each partition, associated with the event streams, to a respective reactive router that resides in a controlling application.

8. The computer-implemented method of claim 7, wherein the differences with respect to the maximum throughput are differences between a maximum ceiling throughput and measured input throughput.

9. The computer-implemented method of claim 7, wherein the method includes
examining, by the respective reactive router, a payload of each packet and determining a module of the controlling application to process the packet based on the examination; and
inserting, by the respective reactive router, each packet into an input queue of the determined module.

10. The computer-implemented method of claim 9, wherein the method includes creating one or more additional queues, by the respective reactive router, when one or more input queues of modules of the controlling application become unbalanced.

11. The computer-implemented method of claim 9, wherein the method includes re-directing packets, by the respective reactive router, using a payload filter policy that includes a quality of service parameter and peer information.

12. The computer-implemented method of claim 9, wherein method includes the respective reactive router selectively distributing individual packets to software defined network (SDN) and/or Internet of things (IoT) network nodes using a cache that maintains registration of the SDN and/or IoT network nodes based on domains.

13. A non-transitory computer-readable medium storing computer instructions, that when executed by one or more processors, cause the one or more processors to perform operations comprising:
receiving event streams in a data handler, each event stream originating from a respective source network;
separating the event streams from the data handler into a number of partitions based on topics of the event streams;
tracking loading of the event streams into the number of partitions to balance the loading by controlling the number of partitions, wherein the tracking includes tracking input throughput peaks and output throughput peaks of the number of partitions;
resizing the number of partitions based on captured peak values and differences with respect to a maximum throughput using heuristics and close loop control; and
sending packets of each partition, associated with the event streams, to a respective reactive router that resides in a controlling application.

14. The non-transitory computer-readable medium of claim 13, wherein the operations include
examining, by the respective reactive router, a payload of each packet and determining a module of the controlling application to process the packet based on the examination; and
inserting, by the respective reactive router, each packet into an input queue of the determined module.

15. The non-transitory computer-readable medium of claim 14, wherein the operations include creating one or more additional queues, by the respective reactive router, when one or more input queues of modules of the controlling application become unbalanced.

16. The non-transitory computer-readable medium of claim 14, wherein the operations include re-directing packets, by the respective reactive router, using a payload filter policy that includes a quality of service parameter and peer information.

17. The non-transitory computer-readable medium of claim 14, wherein the operations include the respective reactive router selectively distributing individual packets to software defined network (SDN) and/or Internet of things (IoT) network nodes using a cache that maintains registration of the SDN and/or IoT network nodes based on domains.

* * * * *